(12) United States Patent
Li et al.

(10) Patent No.: US 9,813,095 B2
(45) Date of Patent: Nov. 7, 2017

(54) GLASSES-TYPE COMMUNICATIONS APPARATUS, SYSTEM, AND METHOD

(71) Applicant: Huawei Technologies Co., Ltd., Shenzhen (CN)

(72) Inventors: Shanfu Li, Shenzhen (CN); Maosheng Huang, Shenzhen (CN); Mingjie Dong, Shenzhen (CN); Yulin Zheng, Shenzhen (CN); Kangmin Huang, Shenzhen (CN); Huimin Zhang, Shenzhen (CN); Weidong Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/748,762

(22) Filed: Jun. 24, 2015

(65) Prior Publication Data

US 2015/0295610 A1    Oct. 15, 2015

Related U.S. Application Data

(63) Continuation of application No. 14/466,287, filed on Aug. 22, 2014, now Pat. No. 9,100,097, which is a
(Continued)

(30) Foreign Application Priority Data

Dec. 22, 2012  (CN) .......................... 2012 1 0563136

(51) Int. Cl.
*H04M 1/02*        (2006.01)
*H04B 1/3827*     (2015.01)
(Continued)

(52) U.S. Cl.
CPC .............. *H04B 1/385* (2013.01); *H04B 1/38* (2013.01); *H04M 1/0262* (2013.01);
(Continued)

(58) Field of Classification Search
CPC ............ G06F 3/11; G06F 3/013; G06F 3/017; H04W 4/008; H04W 4/16
(Continued)

(56) References Cited

U.S. PATENT DOCUMENTS

2005/0088572 A1*  4/2005  Pandit ................ H04N 1/00127
                                                                 348/375
2005/0286025 A1   12/2005  Cho et al.
(Continued)

FOREIGN PATENT DOCUMENTS

CN           1716084 A      1/2006
CN         101424787 A      5/2009
(Continued)

OTHER PUBLICATIONS

Foreign Communication From A Counterpart Application, Chinese Application No. 201210563136.4, Chinese Office Action dated Nov. 23, 2015, 5 pages.
(Continued)

*Primary Examiner* — Jamal Javaid
(74) *Attorney, Agent, or Firm* — Conley Rose, P.C.

(57) ABSTRACT

A glasses-type communications apparatus is provided that includes a frame; a display module set on the frame configured to receive data information and generate a corresponding visual picture according to the data information for the user to watch; a camera module set on the frame configured to obtain image information and transfer the image information; and a communications module set on the frame configured to set up a communications channel with an external processing apparatus by using a communications protocol, where the communications module receives data transmitted by the external processing apparatus through the communications channel, so as to parse the data to obtain the data information, and send the data information to the
(Continued)

display module; where the communications module is further configured to receive the image information output by the camera module, and transfer the image information to the external processing apparatus by using the communications channel.

20 Claims, 16 Drawing Sheets

Related U.S. Application Data continuation of application No. PCT/CN2013/080960, filed on Aug. 7, 2013.

(51) Int. Cl.
| | | |
|---|---|---|
| *H04B 1/38* | (2015.01) | |
| *H04M 1/253* | (2006.01) | |
| *H04W 4/00* | (2009.01) | |
| *H04W 4/16* | (2009.01) | |
| *H04W 4/02* | (2009.01) | |

(52) U.S. Cl.
CPC ....... *H04M 1/0264* (2013.01); *H04M 1/0266* (2013.01); *H04M 1/2535* (2013.01); *H04W 4/008* (2013.01); *H04W 4/02* (2013.01); *H04W 4/16* (2013.01); *H04B 2001/3866* (2013.01)

(58) Field of Classification Search
USPC ............... 370/329, 328; 345/633, 8, 419
See application file for complete search history.

(56) References Cited

U.S. PATENT DOCUMENTS

| | | | | |
|---|---|---|---|---|
| 2010/0091094 A1* | 4/2010 | Sekowski | ............ | B66F 9/0755 348/50 |
| 2011/0179104 A1 | 7/2011 | Hakoda et al. | | |
| 2011/0214082 A1 | 9/2011 | Osterhout et al. | | |
| 2011/0307842 A1 | 12/2011 | Chiang et al. | | |
| 2012/0200793 A1* | 8/2012 | Tehrani | ............... | H04N 13/0404 349/15 |
| 2013/0044042 A1* | 2/2013 | Olsson | ............... | G02B 27/0176 345/8 |
| 2013/0307855 A1 | 11/2013 | Lamb et al. | | |

FOREIGN PATENT DOCUMENTS

| | | |
|---|---|---|
| CN | 101498845 A | 8/2009 |
| CN | 201341167 Y | 11/2009 |
| CN | 101612032 A | 12/2009 |
| CN | 101615168 A | 12/2009 |
| CN | 101675371 A | 3/2010 |
| CN | 101796450 A | 8/2010 |
| CN | 101819334 A | 9/2010 |
| CN | 201657179 U | 11/2010 |
| CN | 102026346 A | 4/2011 |
| CN | 102067095 A | 5/2011 |
| CN | 201903695 U | 7/2011 |
| CN | 202057915 U | 11/2011 |
| CN | 102629465 A | 8/2012 |
| CN | 102783186 A | 11/2012 |
| CN | 202600565 U | 12/2012 |
| EP | 1027627 B1 | 2/2009 |
| WO | 2010062479 A1 | 6/2010 |
| WO | 2010062481 A1 | 6/2010 |
| WO | 2011112165 A1 | 9/2011 |

OTHER PUBLICATIONS

Partial English Translation and Abstract of Chinese Patent Application No. CN101424787A, Sep. 18, 2014, 3 pages.
Partial English Translation and Abstract of Chinese Patent Application No. CN201341167Y, Sep. 1, 2014, 27 pages.
Partial English Translation and Abstract of Chinese Patent Application No. CN201657179U, Sep. 1, 2014, 11 pages.
Partial English Translation and Abstract of Chinese Patent Application No. CN201903695U, Sep. 1, 2014, 48 pages.
Partial English Translation and Abstract of Chinese Patent Application No. CN202600565U, Sep. 1, 2014, 12 pages.
Foreign Communication From A Counterpart Application, European Application No. 13863962.0, Extended European Search Report dated Feb. 19, 2015, 10 pages.
Foreign Communication From A Counterpart Application, PCT Application No. PCT/CN2013/080960, International Search Report dated Nov. 14, 2013, 8 pages.
Foreign Communication From A Counterpart Application, PCT Application No. PCT/CN2013/080960, Written Opinion dated Nov. 14, 2013, 11 pages.
Foreign Communication From A Counterpart Application, Chinese Application No. 201210563136.4, Chinese Office Action dated May 20, 2015, 9 pages.
Foreign Communication From A Counterpart Application, Chinese Application No. 201210563136.4, Chinese Search Report dated May 12, 2015, 2 pages.
Office Action dated Nov. 26, 2014, 15 pages, U.S. Appl. No. 14/466,287, filed Aug. 22, 2014.
Foreign Communication From A Counterpart Application, Chinese Application No. 201510601205.X, Chinese Search Report dated Feb. 14, 2017, 3 pages.
Foreign Communication From A Counterpart Application, Chinese Application No. 201510601205.X, Chinese Office Action Feb. 23, 2017, 4 pages.
Machine Translation and Abstract of Chinese Patent Application No. CN101612032, Dec. 30, 2009, 5 pages.
Foreign Communication From A Counterpart Application, Chinese Application No. 201510600926.9, Chinese Office Action dated Mar. 21, 2017, 3 pages.
Foreign Communication From A Counterpart Application, Chinese Application No. 201510600926.9, Chinese Search Report dated Mar. 7, 2017, 2 pages.
Machine Translation and Abstract of Chinese Patent Application No. CN101819334, Sep. 1, 2010, 19 pages.
Machine Translation and Abstract of Chinese Patent Application No. CN202057915, Nov. 30, 2011, 7 pages.
Foreign Communication From A Counterpart Application, Chinese Application No. 201510601004.X, Chinese Search Report dated Mar. 20, 2017, 2 pages.
Foreign Communication From A Counterpart Application, Chinese Application No. 201510601004.X, Chinese Office Action dated Mar. 28, 2017, 5 pages.
Machine Translation and Abstract of Chinese Publication No. CN101498845, Aug. 5, 2009, 5 pages.
Foreign Communication From A Counterpart Application, Chinese Application No. 201510600524.9, Chinese Search Report dated Apr. 14, 2017, 2 pages.
Foreign Communication From A Counterpart Application, Chinese Application No. 201510600524.9, Chinese Office Action dated Apr. 25, 2017, 4 pages.

* cited by examiner

Pulse: 92
Blood pressure: 93/120
Body temperature: 37.2
Walking distance: 5.3km
Energy consumption: 50 kcal
Fatigue index: 4.6
Tips:
Drink 95 ml water.
Take a break for 10 minutes.

FIG. 23

GLASSES-TYPE COMMUNICATIONS APPARATUS, SYSTEM, AND METHOD

CROSS-REFERENCE TO RELATED APPLICATIONS

This application is a continuation of U.S. application Ser. No. 14/466,287, filed on Aug. 22, 2014, which is a continuation of International Application No. PCT/CN2013/080960, filed on Aug. 7, 2013, which claims priority to Chinese Patent Application No. 201210563136.4 filed on Dec. 22, 2012. The afore-mentioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to radio communications technologies, and in particular, to a glasses-type communications apparatus, system, and method.

BACKGROUND

With the development of communications technologies, a consumer can use a mobile phone to experience communications functions, such as a voice call, a video chat, and webpage browsing. Moreover, with the constant improvement of communications networks, the consumer can perform the communications described above in different places.

An existing communications device requires the user to always hold the mobile phone to implement the foregoing functions, which cannot satisfy the consumer's communications requirement of "any time, any place". For example, the consumer cannot perform video chatting while walking. Moreover, the consumer needs to always hold the mobile phone, so that the consumer's hands cannot be released.

SUMMARY

In view of this, the present invention provides a glasses-type communications apparatus, a glasses-type information processing apparatus, a method for controlling a glasses-type communications system, a display system with a variable optical path length applicable to a glasses-type communications apparatus or a glasses-type information processing apparatus, a method for controlling an optical path length of a display system, a navigation method by using a glasses-type communications apparatus, and a method for detecting biological information by using a glasses-type communications apparatus, where a pair of glasses is used to bear various information processing entities required by a user, so as to enrich the user's life, facilitate the use for the user, and release the user's hands.

In a first aspect, a glasses-type communications apparatus is provided, including: a frame, where the frame is configured to allow a user to wear the glasses-type communications apparatus on the head; a display module set on the frame configured to receive data information and generate a corresponding visual picture according to the data information for the user to watch; a camera module set on the frame configured to obtain image information and output the image information; and a communications module set on the frame configured to set up a communications channel with an external processing apparatus by using a communications protocol, where the communications module receives data transmitted by the external processing apparatus through the communications channel, so as to parse the data to obtain the data information, and send the data information to the display module; where the communications module is further configured to receive image information output by the camera module, and transfer the image information to the external processing apparatus through the communications channel.

In a first possible implementation manner with reference to the first aspect, the glasses-type communications apparatus further includes a network connection module, where the network connection module is set on the frame and connected to the display module, and is configured to access a network server to obtain network data, convert the network data into data information, and transfer the data information to the display module.

With reference to the first aspect and the first possible implementation manner, in a second possible implementation manner, the network connection module is further connected to the camera module, so as to transfer the image information output by the camera module to the network server.

With reference to the first aspect, the first aspect and the first possible implementation manner, or the first aspect and the first and second possible implementation manners, in a third possible implementation manner, the communications protocol is a wireless communications protocol or a wired communications protocol, where the wireless communications protocol includes one of Wireless-Fidelity (Wi-Fi), Zigbee®, Bluetooth®, or Wireless high-definition multimedia interface (HDMI).

With reference to the first aspect, the first aspect and the first possible implementation manner, or the first aspect and the first and second possible implementation manners, in a fourth possible implementation manner, the communications module is further configured to parse the data transmitted by the external processing apparatus to obtain a picture control instruction, and send the picture control instruction to the display module. Correspondingly, the display module is further configured to receive the picture control instruction, and change, according to the picture control instruction, a visual picture presented by the display module.

In a second aspect, a glasses-type information processing apparatus is provided, including: a frame, where the frame is configured to allow a user to wear the glasses-type communications apparatus on the head; at least one display module, where the at least one display module is set on the frame, and is configured to receive data information, and generate a corresponding visual picture according to the data information for the user to watch; at least one camera module set on the frame configured to obtain image information and output the image information; and a processing module set on the frame and connected to the at least one display module and the at least one camera module configured to transfer the data information to the at least one display module, and receive the image information output by the camera module.

With reference to the second aspect, in a first possible implementation manner, the at least one camera module is further configured to obtain information about an image beyond the user's line of sight.

With reference to the second aspect, in a second possible implementation manner, the at least one camera module includes at least one light-field camera apparatus.

With reference to the second aspect, in a third possible implementation manner, the at least one camera module includes a backward camera, where the backward camera is configured to obtain information about an image behind the user. A direction behind the user indicates a direction opposite to a direction of the user's line of sight.

With reference to the second aspect and the third possible implementation manner, in a fourth possible implementation manner, the backward camera is rotatable, so as to adjust a shooting range of the backward camera.

With reference to the second aspect, the second aspect and the first possible implementation manner, the second aspect and the second possible implementation manner, the second aspect and the third possible implementation manner, the second aspect and the third possible implementation manner and the fourth possible implementation manner, in a fifth possible implementation manner, the at least one camera module is configured to obtain information about at least two groups of images within at least two shooting ranges that are continuous in space. Correspondingly, the processing module is configured to receive the information about the at least two groups of images and merge the information about the two groups of images, where a merging manner specifically includes selecting a portion from information about each group of images to make a combination, or merging the information about the at least two groups of images along edges in sequence.

In a third aspect, a glasses-type information processing apparatus is provided, including: a frame, where the frame is configured to allow a user to wear the glasses-type communications apparatus on the head; at least one display module, where the at least one display module is set on the frame, and is configured to receive data information, and generate a corresponding visual picture according to the received data information for the user to watch; at least one camera module set on the frame configured to obtain image information and output the image information; at least one microphone module, where the microphone module is set on the frame, and is configured to obtain voice information and output the voice information; and a processing module set on the frame and connected to the at least one display module, the at least one camera module, and the at least one microphone module configured to transfer the data information to the at least one display module, and receive the image information output by the camera module and the voice information output by the microphone module.

With reference to the third aspect, in a first possible implementation manner, the apparatus includes at least two camera modules, where the at least two camera modules are configured to obtain information about images within different shooting ranges.

With reference to the third aspect and the first possible implementation manner, in a second possible implementation manner, the processing module is configured to receive information about multiple groups of images within different shooting ranges obtained by the at least two camera modules, and merge the information about multiple groups of images within different shooting ranges obtained by the at least two camera modules, where a merging manner specifically includes selecting a portion of information about each group of images from the information about multiple groups of images to make a combination, or merging the information about the multiple groups of images along edges in sequence.

With reference to the third aspect, the third aspect and the first possible implementation manner, or the third aspect and the first possible implementation manner and the second possible implementation manner, in a third possible implementation manner, the processing module is further configured to perform speech recognition on the received voice information, and make a response according to the speech recognition result of the voice information.

With reference to the third aspect, or with reference to the third aspect and any one or more possible implementation manners of the first to the third possible implementation manners formed based on the third aspect, in a fourth possible implementation manner, the at least one camera module is adjustable in direction, so as to obtain information about images within different shooting ranges.

With reference to the third aspect, or with reference to the third aspect and any one or more possible implementation manners of the first to the fourth possible implementation manners formed based on the third aspect, in a fifth possible implementation manner, the at least one camera module includes at least a light-field camera apparatus.

With reference to the third aspect, or with reference to the third aspect and any one or more possible implementation manners of the first to the fifth possible implementation manners formed based on the third aspect, in a sixth possible implementation manner, the apparatus further includes at least one storage battery module, where the storage battery module is set on the frame, and is configured to provide electrical energy to the at least one display module, the at least one camera module, the at least one microphone module, and the processing module.

With reference to the third aspect, or with reference to the third aspect and any one or more possible implementation manners of the first to the sixth possible implementation manners formed based on the third aspect, in a seventh possible implementation manner, the apparatus further includes at least one electromagnetic induction coil module, where the at least one electromagnetic induction coil module is set on the frame, and is configured to obtain electrical energy in a manner of electromagnetic induction and store the obtained electrical energy to the storage battery module.

With reference to the third aspect, or with reference to the third aspect and any one or more possible implementation manners of the first to the seventh possible implementation manners formed based on the third aspect, in an eighth possible implementation manner, the apparatus further includes at least one solar panel, where the at least one solar panel is set on the frame to obtain solar energy, and convert the solar energy into electrical energy to recharge the storage battery module.

With reference to the third aspect, or with reference to the third aspect and any one or more possible implementation manners of the first to the eighth possible implementation manners formed based on the third aspect, in a ninth possible implementation manner, the at least one display module is configured to display content such as an image, a video, a picture, or a text.

With reference to the third aspect, or with reference to the third aspect and any one or more possible implementation manners of the first to the ninth possible implementation manners formed based on the third aspect, in a tenth possible implementation manner, the apparatus further includes a display control module, where the display control module is set on the frame and is configured to control the display module to emit a display laser.

With reference to the third aspect, or with reference to the third aspect and any one or more possible implementation manners of the first to ninth possible implementation manners formed based on the third aspect, in an eleventh possible implementation manner, the apparatus further includes a line-of-sight analyzing and processing module, where the line-of-sight analyzing and processing module is set on the frame and is configured to analyze a user's pupil image taken by the camera module, and output focus information concerned by the user's line of sight. Correspondingly, the processing module is configured to receive the focus information output by the line-of-sight analyzing and processing module, and change, according to the focus information, data information output to the at least one display module, so that the at least one display apparatus displays a visual picture matching the focus concerned by the user's vision.

In a fourth aspect, a method for controlling a glasses-type communications system is provided, where the glasses-type communications system includes a projecting module, a display module, an image-acquiring module, a processing module, and a camera module, including: projecting, by the projecting module, a displayed content displayed by the display module onto a plane; acquiring, by the image-acquiring module, an image of the displayed content projected onto the plane and a control gesture superimposed on the displayed content, and outputs the image with a superimposed control gesture; receiving, by the processing module, the image with the superimposed control gesture, analyzes the image to generate a control instruction corresponding to the control gesture, and outputs the control instruction to the display module; and executing, by the display module, the control instruction, so as to present a displayed content matching the control instruction.

In a fifth aspect, a navigation method by using a glasses-type communications apparatus is provided, where the glasses-type communications apparatus includes at least one display module, a communications module, a processing module, at least one camera module, and at least one microphone module, and the method includes: receiving, by the microphone module or the display module, destination address information of a destination location; obtaining, by the communications module, or the processing module, or the at least camera module, location information of a current location of the glasses-type communications apparatus; obtaining, by the processor, information about a path from the current location to the destination location according to the destination address information and the current location information; and displaying, by the display module, the information about the path.

With reference to the fifth aspect, in a first possible implementation manner, when the current location information is obtained by the at least one camera module, the obtaining, by the camera module, the location information of the current location of the glasses-type communications apparatus specifically includes: acquiring, by the camera module, an image of an environment around the location of the glasses-type communications apparatus; and analyzing the acquired image of the environment around the location of the glasses-type communications apparatus, so as to obtain the location information of the current location of the glasses-type communications apparatus.

With reference to the fifth aspect and the first possible implementation manner, in a second possible implementation manner, when the current location information is obtained by the processing module, the obtaining, by the processing module, the location information of the current location of the glasses-type communications apparatus specifically includes obtaining global positioning system (GPS) information of the glasses-type communications apparatus, and obtaining, by the processor, the location information of the current location of the glasses-type communications apparatus according to the GPS information.

With reference to the fifth aspect, the first possible implementation manner and the second possible implementation manner, in a third possible implementation manner, the obtaining, by the processor, the information about the path from the current location to the destination location according to the destination address information and the current location information specifically includes: obtaining, by the processor, the information about the path from the current location to the destination location by performing calculation according to the destination address information and the current location information; or sending, by the processor, the destination address information and the current location information to a network server by using the communications module, and receiving, by using the communications module, the information about the path from the current location to the destination location that is calculated by the network server according to the destination location information and the current location information.

In a sixth aspect, a display system with a variable optical path length is provided, including: an imaging unit configured to receive image information, and emit display light corresponding to the image information according to the received image information; an optical path length adjusting unit set in a transmission path of the display light configured to adjust an optical path length of the display light; and a reflecting unit set in a transmission path of the display light adjusted by the optical path length adjusting unit configured to reflect the display light adjusted by the optical path length adjusting unit.

With reference to the sixth aspect, in a first possible implementation manner, the optical path length adjusting unit includes at least two optical path length settings of a long optical path length and a short optical path length, which respectively correspond to a short optical path length display image and a long optical path length display image.

With reference to the sixth aspect, in a second possible implementation manner, the display system with a variable optical path length includes at least two sub-optical path length adjusting units, where the at least two sub-optical path length adjusting units are any two of a long optical path length adjusting unit, a medium optical path length adjusting unit, and a short optical path length adjusting unit.

With reference to the sixth aspect and the second possible implementation manner, in a third possible implementation manner, a reflection angle for reflecting at least 2+1 times is smaller than 5 degrees.

With reference to the sixth aspect, in a fourth possible implementation manner, the display system further includes a detecting unit configured to detect a size of pupils, and calculate a vision distance of a current vision point of a person's eyes; and a controlling unit configured to control the optical path length adjusting unit to adjust the optical path length of the light according to the vision distance of the vision point of the person's eyes.

With reference to the sixth aspect, in a fifth possible implementation manner, the manner of adjusting an optical path length of the optical path length adjusting unit includes selecting a first optical path length adjusting subunit or a second optical path length adjusting subunit in the optical path length adjusting unit to operate, or controlling the number of reflection times of image-displaying light in an optical path length increasing unit.

In a seventh aspect, a method for controlling an optical path length of a display system is provided, including: detecting a size of pupils, and calculating a vision distance of a current vision point of a person's eyes according to the size of the pupils; and adjusting an optical path length of the optical path length adjusting unit according to the vision distance of the current vision point of the person's eyes.

With reference to the seventh aspect, in a first possible implementation manner, the detecting the size of the pupils includes: obtaining a pupil image; and obtaining the size of the pupils according to the pupil image, and then estimating the vision distance of the current vision point of the person's eyes according to the size of the pupils.

With reference to the seventh aspect, in a second possible implementation manner, the manner of adjusting an optical path length of the optical path length adjusting unit specifically includes selecting a first optical path length adjusting subunit or a second optical path length adjusting subunit in the optical path length adjusting unit to operate, or controlling the number of reflection times of image-displaying light in the optical path length increasing unit.

In an eighth aspect, a method for detecting biological information by using a glasses-type communications apparatus is provided, where the glasses-type communications apparatus includes a state sensor module, a processor module, a communications module, and a display module, and the detecting method includes obtaining biological information by using the state sensor module, analyzing the biological information and outputting biological state information, where the biological state information is obtained by the communications module or the processor module; and displaying, by the display module, the biological stage information.

With reference to the eighth aspect, in a first possible implementation manner, the communications apparatus transfers the biological information to a cloud, the cloud analyzes the biological information, and then the cloud outputs the biological state information.

With reference to the eighth aspect, in a second possible implementation manner, the state sensor module detects a user's contact resistance or biological micro electrical signal.

The present invention provides a glasses-type communications apparatus, a glasses-type information processing apparatus, a method for controlling a glasses-type communications system, a display system with a variable optical path length applicable to a glasses-type communications apparatus or a glasses-type information processing apparatus, a method for controlling an optical path length of a display system, a navigation method by using a glasses-type communications apparatus, and a method for detecting biological information by using a glasses-type communications apparatus, where a pair of glasses is used to bear various information processing entities required by a user, so as to enrich the user's life, facilitate the use for the user, and release the user's hands.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

FIG. 23 is an example of displaying a user's health information by using a glasses-type communications apparatus according to the present invention;

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Technologies described herein may be applied to various radio communications systems. A radio communications system may be a current Second Generation (2G) or Third Generation (3G) communications system or a next generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, or another communications system of the like.

Figure 1:
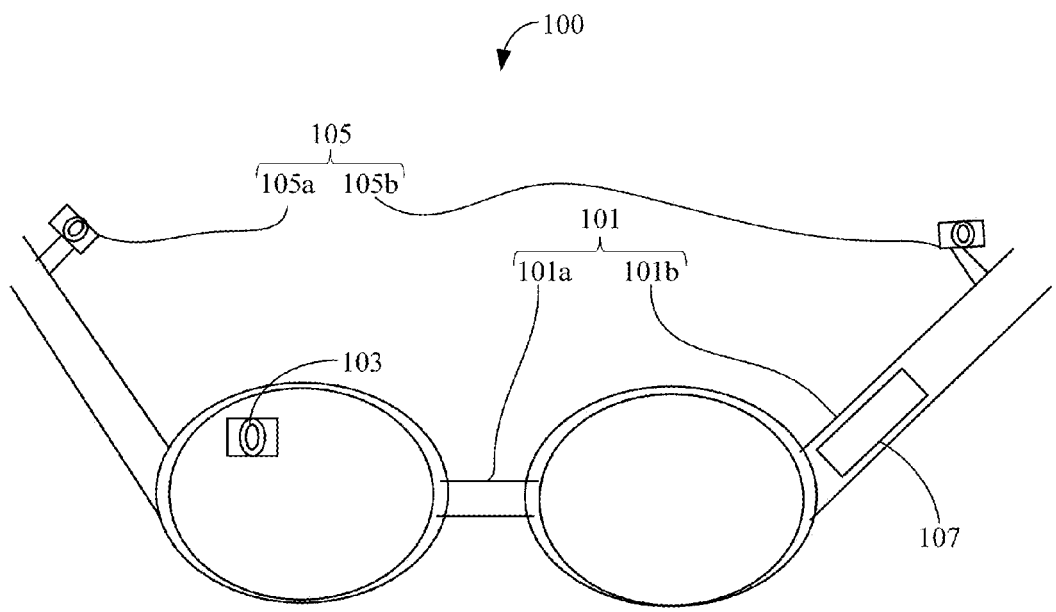
FIG. 1 is a schematic diagram of a first glasses-type communications apparatus according to an embodiment of the present invention.

FIG. 1 is a schematic diagram of a glasses-type communications apparatus according to an embodiment of the present invention. As shown in FIG. 1, a glasses-type communications apparatus 100 according to the embodiment includes a frame 101, a display module 103, a camera module 105, and a communications module 107.

The frame 101 is configured to allow a user to wear the glasses-type communications apparatus on the head.

The frame 101 is a support apparatus of the glasses-type communications apparatus according to the present invention, and includes one beam 101a and two support arms 101b hinged respectively to both ends of the beam. The beam 101a and the two support arms 101b form a support apparatus that can be worn on the head, so as to support other modules of the glasses-type communications apparatus.

The display module 103 is set on the frame 101, and is configured to receive data information and generate a corresponding visual picture according to the data information for the user to watch.

The display module 103 may be a common liquid-crystal display (LCD) or light-emitting diode (LED) display screen configured to display communication information that has been processed by an image processor, such as communication content in a form of a text, an image, a video, or the like. In addition, the display module 103 may also be an organic light-emitting diode (OLED) display screen. The display module 103 according to the present invention may be set on the beam 101a of the frame 101, so that when the user wears the frame 101 on the head, the display module 103 is located in front of the user's eyes, that is, a position within the user's line of sight. Therefore, the user can watch content displayed by the display module 103 normally when the display module 103 is in operation.

The camera module 105 is set on the frame 101, and is configured to obtain image information and output the image information.

The camera module 105 may be a micro lens module, where the micro lens module includes a charge-coupled device (CCD) or complementary metal-oxide-semiconductor (CMOS) as a sensor element, and a lens group for modulating incident light, so that the sensor element can implement a function of statically or dynamically obtaining an image. In the present invention, the camera module 105 may be configured to shoot images around the user, and may also be configured to collect the user's control instruction and security verification information such as retina information, and the like. There may be multiple camera modules 105. Specifically, camera modules 105a and 105b are set on both sides of the frame and can rotate 360 degrees to shoot an image at various angles. In addition, the camera module 105 is a light-field camera apparatus. The light-field camera apparatus is characterized in that a micro lens array is added in front of a sensor of a camera, where the camera takes an image on the sensor; or the camera has an array consisting of multiple sensors, where one micro lens array is configured before each sensor, and an image is taken on each sensor.

The communications module 107 is set on the frame 101 and sets up a communications channel with an external processing apparatus by using a communications protocol, where the communications module receives data transmitted by the external processing apparatus through the communications channel, so as to parse the data to obtain data information and send the data information to the display module 103. The communications module 107 is further configured to receive image information output by the camera module 105, and transfers the image information to the external processing apparatus through the communications channel.

In the present invention, the communications module 107 is configured to provide communication between the apparatus and an external communications system by using a communications protocol. The module can provide communication with a wireless communications network or a wired communications network, so as to implement communication of content such as voice and data between the apparatus and the external communications network. The communications protocol is a wireless communications protocol or a wired communications protocol, where the wireless communications protocol includes any one of Wi-Fi, Zigbee®, Bluetooth®, or Wireless HDMI. In addition, the communications module 107 is further configured to parse the data transmitted by the external processing apparatus to obtain a picture control instruction, and send the picture control instruction to the display module 103. Correspondingly, the display module 103 is further configured to receive the picture control instruction, and change a visual picture presented by the display module according to the picture control instruction.

The glasses-type communications apparatus 100 according to the embodiment of the present invention integrates the display module 103, the camera module 105, and the communications module 107 as a whole by using the frame, and sets up a corresponding communications channel with an external server by using the communications module 107 to transfer to or obtain from the external server various required resources such as data information and image information, and present pictures corresponding to various data information to a user by using the display module 103, so that the user can achieve the target of accessing the external server by using the glasses-type communications apparatus 100 and obtain required information at any time and any place, thereby releasing the user's hands to achieve the target of easy interaction.

Figure 2:
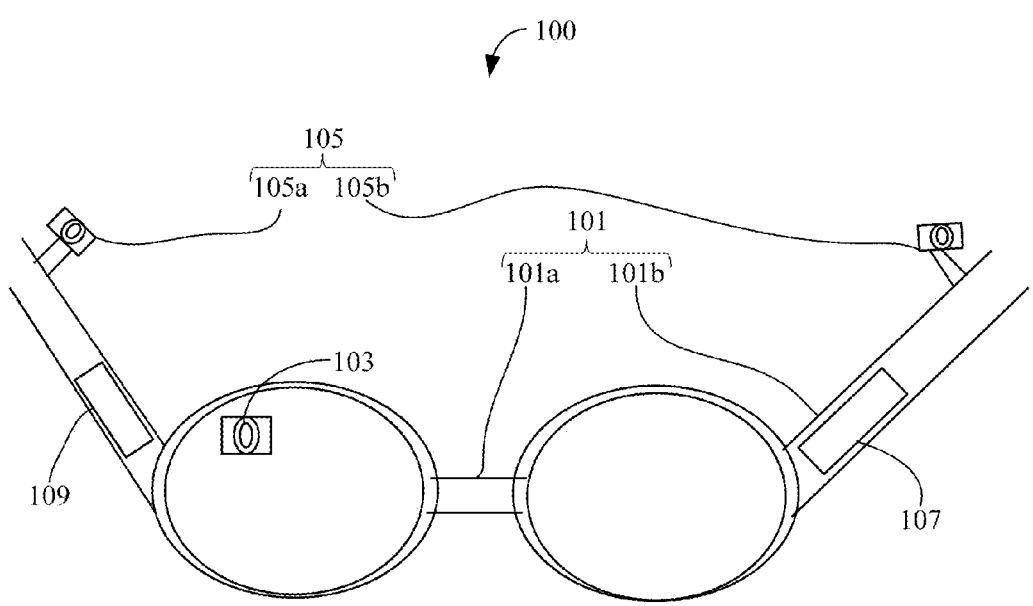
FIG. 2 is a schematic diagram of a second glasses-type communications apparatus according to an embodiment of the present invention.

Referring to FIG. 2, the glasses-type communications apparatus 100 according to the present invention further includes a network connection module 109. The network connection module 109 is set on the frame 101, connected to the display module 103, and configured to access a network server to obtain network data, convert the network data into data information, and transfer the data information to the display module. In addition, the network connection module 109 is further connected to the camera module, so as to transfer the image information output by the camera module 105 to the network server.

Figure 3:
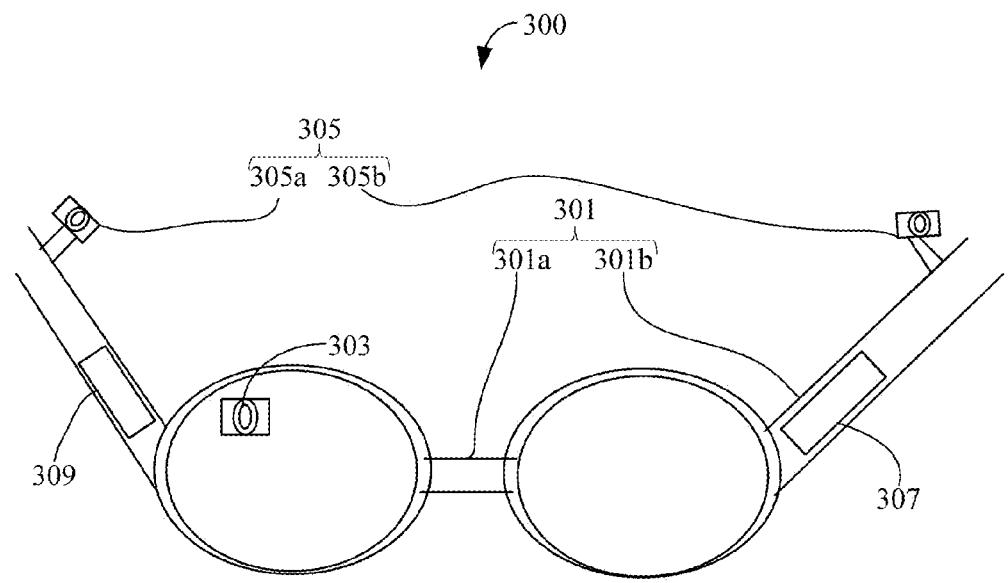
FIG. 3 is a schematic diagram of a first glasses-type information processing apparatus according to an embodiment of the present invention.

Referring to FIG. 3, FIG. 3 illustrates a glasses-type information processing apparatus 300 according to another embodiment of the present invention. The information processing apparatus 300 includes a frame 301, at least one display module 303, at least one camera module 305, and at least one processing module 307.

The frame 301 is configured to allow a user to wear the glasses-type communications apparatus on the head.

The frame 301 is a support apparatus of the glasses-type communications apparatus according to the present invention, and includes one beam 301a and two support arms 301b hinged respectively to both ends of the beam. The beam 301a and the two support arms 301b form a support apparatus that can be worn on the head, so as to support other modules of the glasses-type communications apparatus.

The at least one display module 303 is set on the frame 301, and is configured to receive data information and generate a corresponding visual picture according to the received data information for the user to watch.

The at least one display module 303 may be a common LCD or LED display screen configured to display communication information that has been processed by an image processor, such as communication content in a form of a text, an image, a video, or the like. In addition, the display module 303 may also be an OLED display screen. The display module 303 according to the present invention may be set on the beam 301a of the frame 301, so that when the user wears the frame 301 on the head, the display module 303 is located in front of the user's eyes, that is, a position within the user's line of sight. Therefore, the user can watch content displayed by the display module 303 normally when the display module 303 is in operation.

The at least one camera module 305 is set on the frame 301, and is configured to obtain image information and output the image information.

The at least one camera module 305 may be a micro lens module, where the micro lens module includes a CCD or CMOS as a sensor element, and a lens group for modulating incident light, so that the sensor element can implement a function of statically or dynamically obtaining an image. In the present invention, the camera module 305 may be configured to shoot images around the user, and may also be configured to collect the user's control instruction and security verification information such as retina information, and the like. There may be multiple camera modules 305. Specifically, camera modules 305a and 305b are set on both sides of the frame and they can rotate 360 degrees to shoot an image at various angles. In addition, the at least one camera module 305 may further be configured to obtain information about an image beyond the user's line of sight. That is, an image other than an image within the user's line of sight may be captured by the at least one camera module 305. The captured image may be displayed to the user by using the at least one display module 303, so as to implement a function enabling the user to sense all-around images. Specifically, the at least one camera module includes a backward camera, where the backward camera is configured to obtain information about an image behind the user. A direction behind the user indicates a direction opposite to a direction of the user's line of sight. In addition, the at least one camera module 305 is a light-field camera apparatus. The light-field camera apparatus is characterized in that a micro lens array is added in front of a sensor of a camera, where the camera takes an image on a sensor; or the camera has an array consisting of multiple sensors, where one micro lens array is configured before each sensor, and an image is taken on each sensor.

The processing module 307 is set on the frame 301 and connected to the at least one display module 303 and the at least one camera module 305, so as to transfer the data information to the at least one display module 303 and receive the image information output by the at least one camera module 305.

The processing module 307 is a combination of various information processors, and includes various hardware processing resources, such as a central processing unit (CPU) for performing calculation and executing a program, and a graphics processing unit (GPU) for performing image processing and video processing calculation. The processing module integrating the various required hardware processing resources as a whole is mainly configured to perform calculation and processing on various images and videos, for example, image, video, or audio encoding and decoding, and image rendering, and may further include other data technical processing, such as speech recognition and image recognition.

The glasses-type information processing apparatus 300 according to the embodiment of the present invention integrates the display module 303, the camera module 305, and the processing module 307 as a whole by using the frame, where the processing module 307 is used to control coordination between the modules, and the at least one display module 303 is used to present picture corresponding to various data information to the user, so that the user can implement information processing and querying at any time and any place by using the glasses-type information processing apparatus 300, so as to release the user's hands and achieve the target of easy interaction.

In addition, the at least one camera module 305 is configured to obtain information about at least two groups of images within at least two shooting ranges that are continuous in space. Correspondingly, the processing module 307 is configured to receive the information about at least two groups of images and merge the information about the at least two groups of images, where a merging manner specifically includes selecting a portion from information about each group of images to make a combination, or merging the information about the at least two groups of images along edges in sequence.

Figure 4:
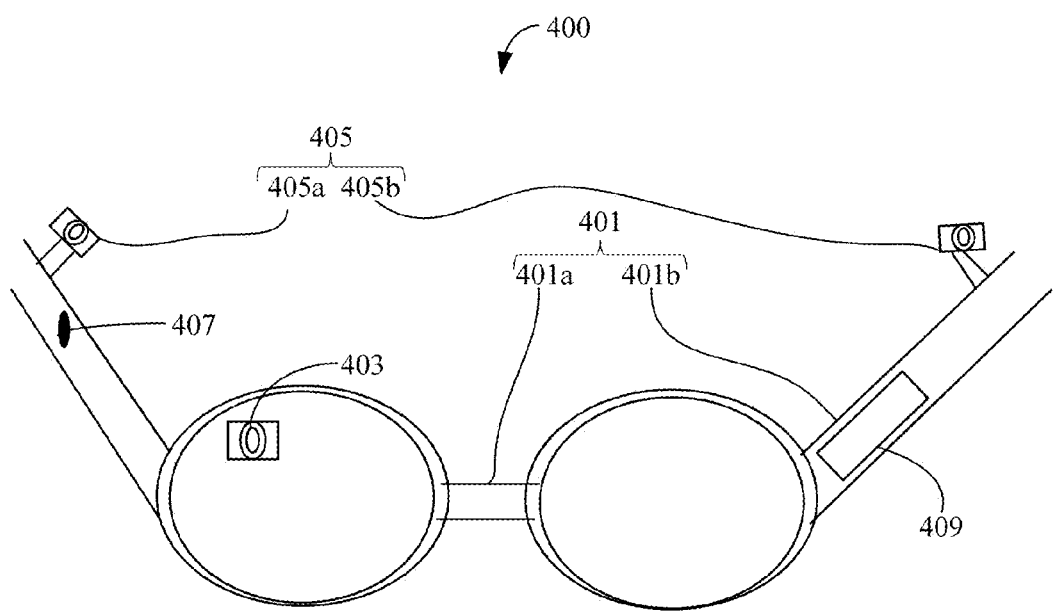
FIG. 4 is a schematic diagram of a second glasses-type information processing apparatus according to an embodiment of the present invention.

Referring to FIG. 4, FIG. 4 illustrates a glasses-type information processing apparatus 400 according to another embodiment of the present invention. The information processing apparatus 400 includes a frame 401, at least one display module 403, at least one camera module 405, at least one microphone module 407, and at least one processing module 409.

The frame 401 is configured to allow a user to wear the glasses-type communications apparatus on the head.

The frame 401 is a support apparatus of the glasses-type communications apparatus according to the present invention, and includes one beam 401*a* and two support arms 401*b* hinged respectively to both ends of the beam. The beam 401*a* and the two support arms 401*b* form a support apparatus that can be worn on the head, so as to support other modules of the glasses-type communications apparatus.

The at least one display module 403 is set on the frame 401, and is configured to receive data information and generate a corresponding visual picture according to the received data information for the user to watch.

The at least one display module 403 may be a common LCD or LED display screen configured to display communication information that has been processed by an image processor, such as communication content in a form of a text, an image, a video, or the like. In addition, the display module 403 may also be an OLED display screen. The display module 403 according to the present invention may be set on the beam 401*a* of the frame 401, so that when the user wears the frame 401 on the head, the display module 403 is located in front of the user's eyes, that is, a position within the user's line of sight. Therefore, the user can watch content displayed by the display module 403 normally when the display module 403 is in operation.

The at least one camera module 405 is set on the frame 401, and is configured to obtain image information and output the image information.

The at least one camera module 405 may be a micro lens module, where the micro lens module includes a CCD or CMOS as a sensor element, and a lens group for modulating incident light, so that the sensor element can implement a function of statically or dynamically obtaining an image. In the present invention, the camera module 405 may be configured to shoot images around the user, and may also be configured to collect the user's control instruction and security verification information such as retina information, and the like. There may be multiple camera modules 405. Specifically, camera modules 405*a* and 405*b* are set on both sides of the frame and they can rotate 360 degrees to shoot an image at various angles. In addition, the at least one camera module 405 may further be configured to obtain information about an image beyond the user's line of sight. That is, an image other than an image within the user's line of sight may be captured by the at least one camera module 405. The captured image may be displayed to the user by using the at least one display module 403, so as to implement a function enabling the user to sense all-around images. Specifically, the at least one camera module includes a backward camera, where the backward camera is configured to obtain information about an image behind the user. A direction behind the user indicates a direction opposite to a direction of the user's line of sight.

The at least one microphone module 407 is set on the frame 401, and is configured to obtain voice information and output the voice information.

The processing module 409 is set on the frame 401 and connected to the at least one display module 403, the at least one camera module 405, and the at least one microphone module 407, so as to transfer the data information to the at least one display module 403, and receive the image information output by the camera module 405 and the voice information output by the microphone module 407.

The processing module 407 is a combination of various information processors, and includes various hardware processing resources, such as a CPU for performing calculation and executing a program, and a GPU for performing image processing and video processing calculation. The processing module integrating the various required hardware processing resources as a whole is mainly configured to perform calculation and processing on various images and videos, for example, image, video, or audio encoding and decoding, and image rendering, and may further include other data technical processing, such as speech recognition and image recognition.

The glasses-type information processing apparatus 400 according to the embodiment of the present invention integrates the display module 403, the camera module 405, the microphone module 407, and the processing module 409 as a whole by using the frame, where the processing module 409 is used to control coordination between the modules, and at least one display module 403 is used to present pictures corresponding to various data information to the user, so that the user can implement information processing and querying at any time and any place by using the glasses-type information processing apparatus 400, so as to release the user's hands and achieve the target of easy interaction.

Further, the processing module 409 according to the embodiment of the present invention is further configured to perform speech recognition on the received voice information, and make a response to the result of performing the speech recognition on the voice information. Specifically, when the user wants to control the glasses-type information processing apparatus 400 by speech, the user may send a speech control instruction. The microphone module 407 receives voice information of the speech control instruction, and transfers the voice information of the speech control instruction to the processing module 409. The processing module 409 converts the voice information into a corresponding speech control instruction that can be identified by the processing module 409, and implement control of the glasses-type information processing apparatus 400 according to the speech control instruction, or to make a response to the user's speech control instruction.

Further, the at least one camera module 405 according to the embodiment of the present invention is adjustable in direction, so as to obtain information about images within different shooting ranges. Specifically, in order to reduce hardware resources configured on the glasses-type information processing apparatus 400 while allowing the camera module 405 to shoot images or videos at an angle as wide as possible, the camera module 405 may be set as a direction-adjustable movable camera apparatus. Specifically, the camera module 405 may be set on a rotatable base, where the rotatable base is fixed to the frame 401. The camera module 405 is driven by the rotation of the base to obtain images in different directions. In addition, the rotatable base may be controlled by a micro motor. That is, a micro motor for controlling a rotation angle of the base is set within the base, where the micro motor can receive a control signal from the processing module 409, so as to achieve the target of shooting a target direction.

Figure 5:
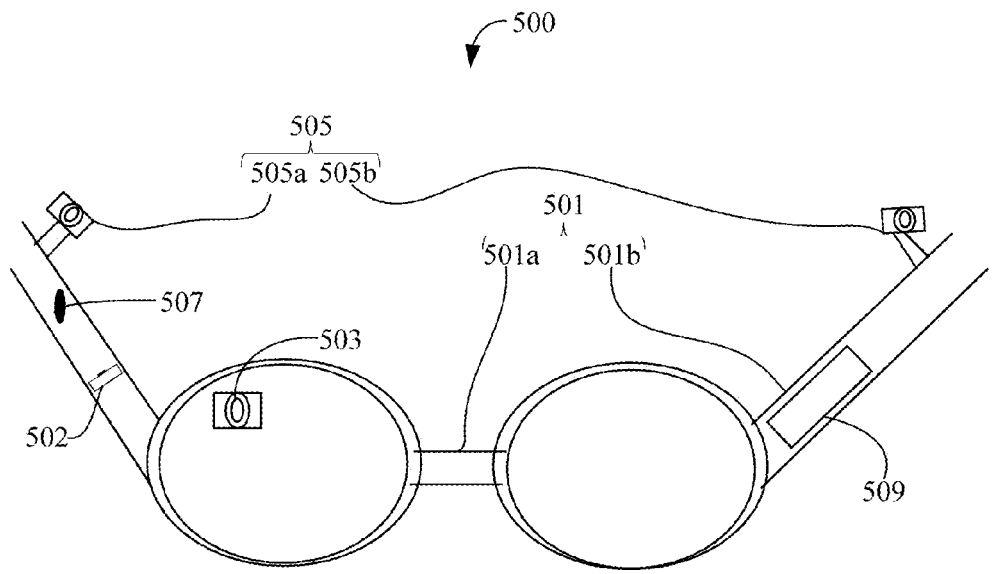
FIG. 5 is a schematic diagram of a third glasses-type information processing apparatus according to an embodiment of the present invention.

Referring to FIG. 5, further, on the basis of the glasses-type information processing apparatus 400 according to the embodiment of the present invention, a glasses-type information processing apparatus 500 according to another embodiment of the present invention further includes at least one storage battery module 502. The storage battery module 502 is set on a frame 501, and is configured to provide electrical energy to at least one display module 503, at least one camera module 505, at least one microphone module 507, and a processing module 509. Similar symbols such as 401 and 501 represent the same component, for example, a frame, which will not be described for brevity. The description of corresponding components in the foregoing embodiments may be referenced to for the detailed structure. The storage battery module 502 is an energy supplying apparatus in the glasses-type information processing apparatus 500 according to the embodiment of the present invention, and may be one of various energy storing apparatuses such as a micro battery, a rechargeable battery, and a bio-battery. In addition, the storage battery module 502 may further integrate a power management circuit for transferring the electrical energy stored in the storage battery module 502 to the foregoing modules as required, so as to achieve proper use of the electrical energy.

Figure 6:
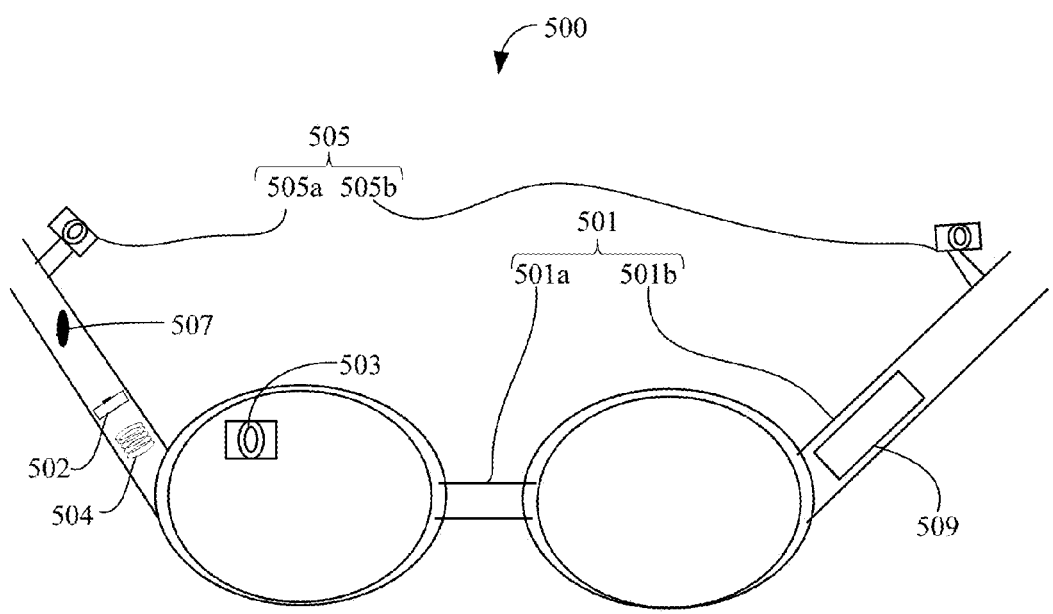
FIG. 6 is a schematic diagram of a fourth glasses-type information processing apparatus according to an embodiment of the present invention.

Referring to FIG. 6, further, a glasses-type information processing apparatus 500 according to another embodiment of the present invention further includes at least one electromagnetic induction coil module 504. The at least one electromagnetic induction coil module 504 is set on the frame 501, and is configured to obtain electrical energy in a manner of electromagnetic induction and store the obtained electrical energy in the storage battery module 502.

Figure 7:
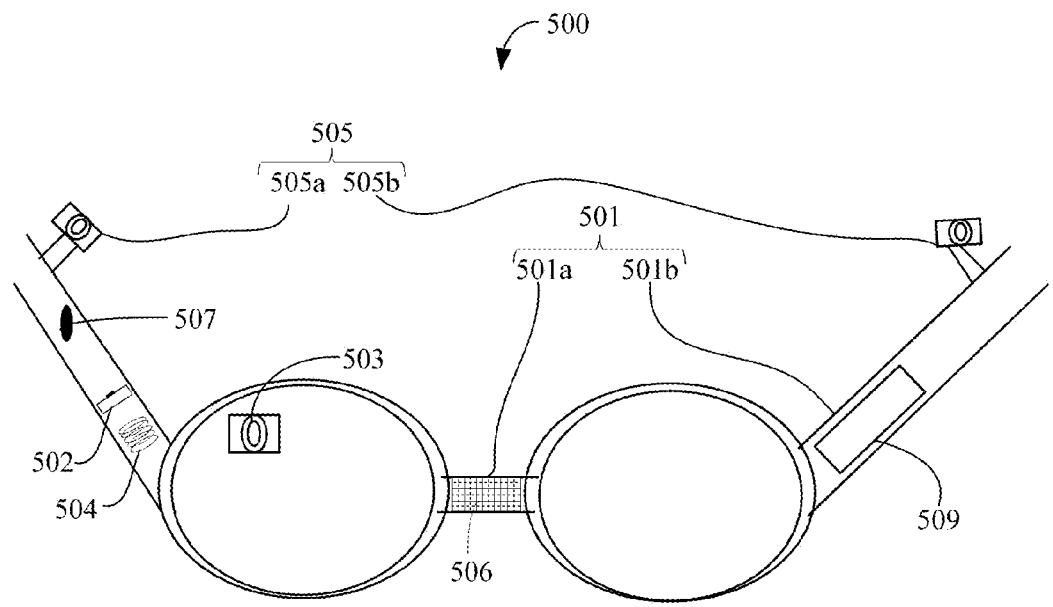
FIG. 7 is a schematic diagram of a fifth glasses-type information processing apparatus according to an embodiment of the present invention.

Referring to FIG. 7, further, a glasses-type information processing apparatus 500 according to another embodiment of the present invention further includes at least one solar panel 506. The solar panel 506 is set on the frame 501 to obtain solar energy, and convert the solar energy into electrical energy to recharge the storage battery module 502. The solar panel 506 according to the embodiment, preferentially, is transparent. The transparent solar panel may be made as lenses of the glasses. The solar panel lens may be planar, concave, or convex, so as to form a pair of glasses with degrees. The solar panel 506 may also be translucent and be colored to a certain extent, for example, a color of a pair of sunglasses. The solar panel 506 may also be opaque. The solar panel 506 may be fixed to the frame 501, where a preferential manner is to be connected movably, for example, by a hinge connection. By using a movable connection, an angle of the solar panel 506 may be adjusted by rotating upside down. A rotatable solar panel helps to adjust the angle to be aligned to the sunlight to obtain solar energy. There may be one or four solar panels 506.

Figure 8:
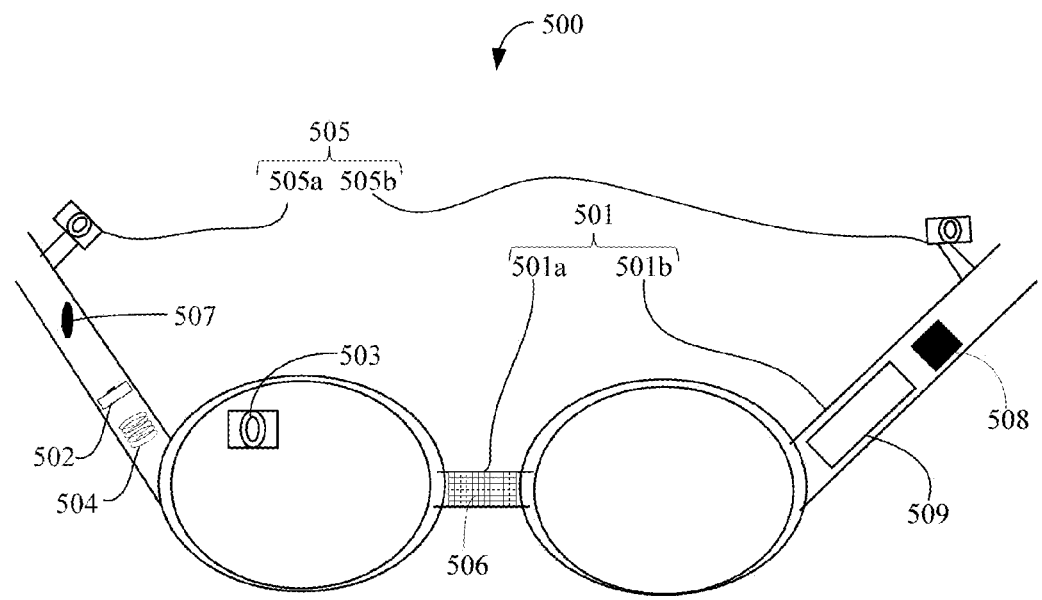
FIG. 8 is a schematic diagram of a sixth glasses-type information processing apparatus according to an embodiment of the present invention.

Referring to FIG. 8, further, a glasses-type information processing apparatus 500 according to another embodiment of the present invention further includes a display control module 508. The display control module 508 is set on the frame 501 and configured to control the display module 503 to emit a display laser.

Figure 9:
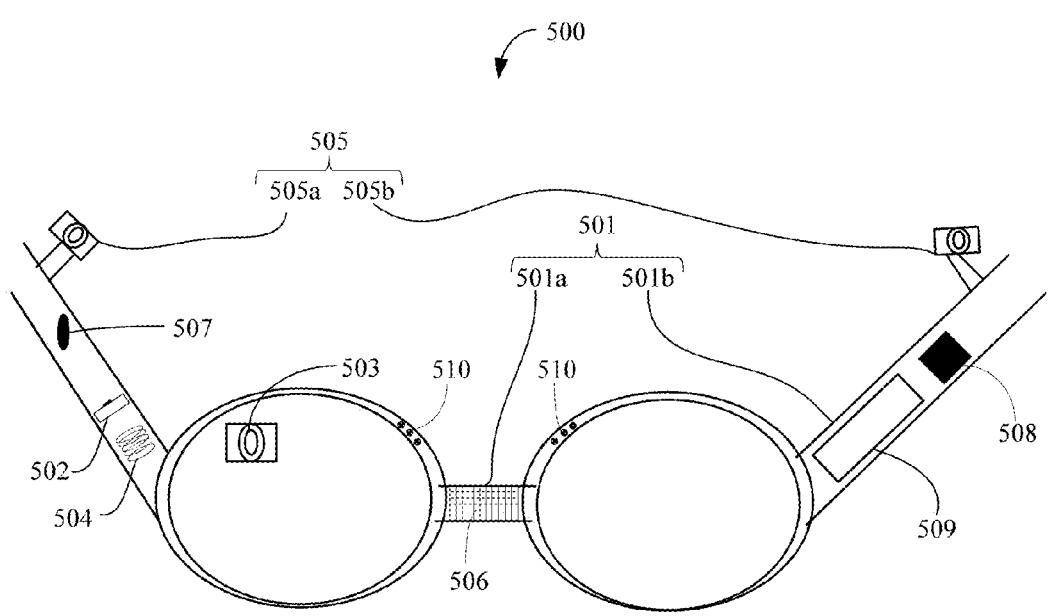
FIG. 9 is a schematic diagram of a seventh glasses-type information processing apparatus according to an embodiment of the present invention.

Referring to FIG. 9, further, a glasses-type information processing apparatus 500 according to another embodiment of the present invention further includes a line-of-sight analyzing and processing module 510. The line-of-sight analyzing and processing module 510 is set on the frame, and is configured to analyze a user's pupil image taken by the camera module 505, and output focus information concerned by the user's line of sight. Correspondingly, the processing module 509 is configured to receive the focus information output by the line-of-sight analyzing and processing module 510, and change, according to the focus information, data information output to the at least one display module 503, so that the at least one display module displays a visual picture matching the focus concerned by the user's line of sight.

Figure 10:
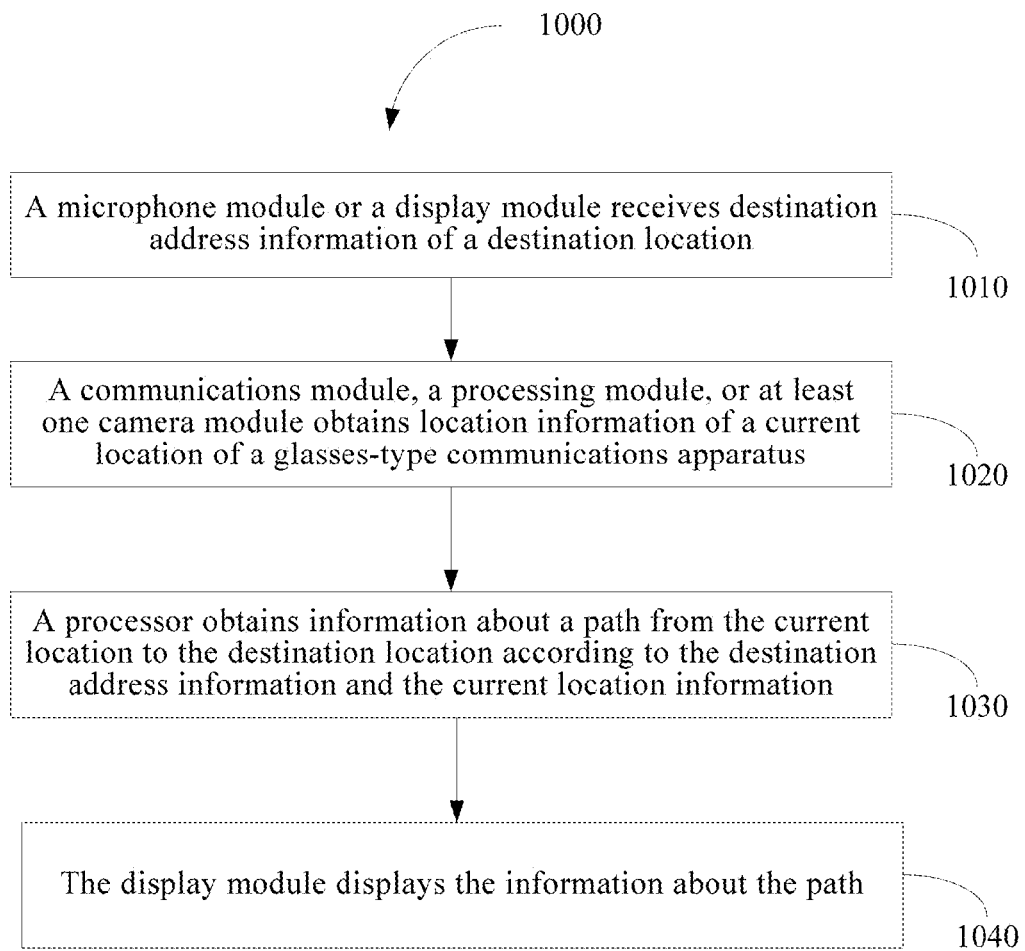
FIG. 10 is a flowchart of a navigation method by using a glasses-type information processing apparatus according to an embodiment of the present invention.

Referring to FIG. 10, in a navigation method by using a glasses-type information processing apparatus according to another embodiment of the present invention, the glasses-type information processing apparatus includes at least one display module, a communications module, a processing module, at least one camera module, and at least one microphone module, and the method includes:

1010. The microphone module or the display module receives destination address information of a destination location.

A user enters destination address information or an address name. Specifically, the user may use the microphone module 104 to enter the address information or address name in a form of a voice instruction.

1020. The communications module, the processing module, or the at least one camera module obtains location information of a current location of the glasses-type communications apparatus.

The communications apparatus obtains the location information thereof. Specifically, the communications apparatus obtains the location information by using a GPS module thereof. Alternatively, the communications apparatus may communicate with a radio base station by using the communications module 102 to obtain the location information thereof.

1030. A processor obtains information about a path from the current location to the destination location according to the destination address information and the current location information.

The communications apparatus calculates the information about the path. Specifically, by using map information, the communications apparatus calculates the path to the destination address based on the address information by using the processing module. Alternatively, when calculating the path, the communications apparatus may consider path status information, where the path status information may be obtained by the communications module 102 from a network, so as to help the communications apparatus to obtain an optimal path by calculation.

1040. The display module displays the information about the path.

In the navigation method by using the glasses-type information processing apparatus according to the embodiment of the present invention, the glasses-type information processing apparatus may be used to automatically obtain the location information thereof, obtain the path with reference to the destination address information entered by the user, and finally display the information about the path by using the display apparatus to the user, so as to implement a function of facilitating use of the user and releasing the user's hands.

Further, when the current location information is obtained by the at least one camera module, the obtaining, by the camera module, the location information of the current location of the glasses-type communications apparatus specifically includes: capturing, by the camera module, an image of an environment around the location of the glasses-type communications apparatus; and analyzing the acquired image of the environment around the location of the glasses-type communications apparatus, so as to obtain the location information of the current location of the glasses-type communications apparatus. Specifically, the camera module 105 takes photos of the surrounding environment. The processing module analyzes the photos to calculate the location information thereof. For example, the camera module shoots a building or a signpost around the user wearing the glasses-type communications apparatus and forms a photo, and the processing module analyzes the photos to calculate the location information of the communications apparatus.

Further, when the current location information is obtained by the processing module, the obtaining, by the processing module, the location information of the current location of the glasses-type communications apparatus specifically includes obtaining GPS information of the glasses-type communications apparatus, and obtaining, by the processor, the location information of the current location of the glasses-type communications apparatus according to the GPS information.

Further, the obtaining, by the processor, information about a path from the current location to the destination location according to the destination address information and the current location information specifically includes: obtaining, by the processor, the information about the path from the current location to the destination location by performing calculation according to the destination address information and the current location information; or sending, by the processor, the destination address information and the current location information to a network server by using the communications module, and receiving, by using the communications module, the information about the path from the current location to the destination location that is calculated by the network server according to the destination address information and the current location information.

Figure 11:
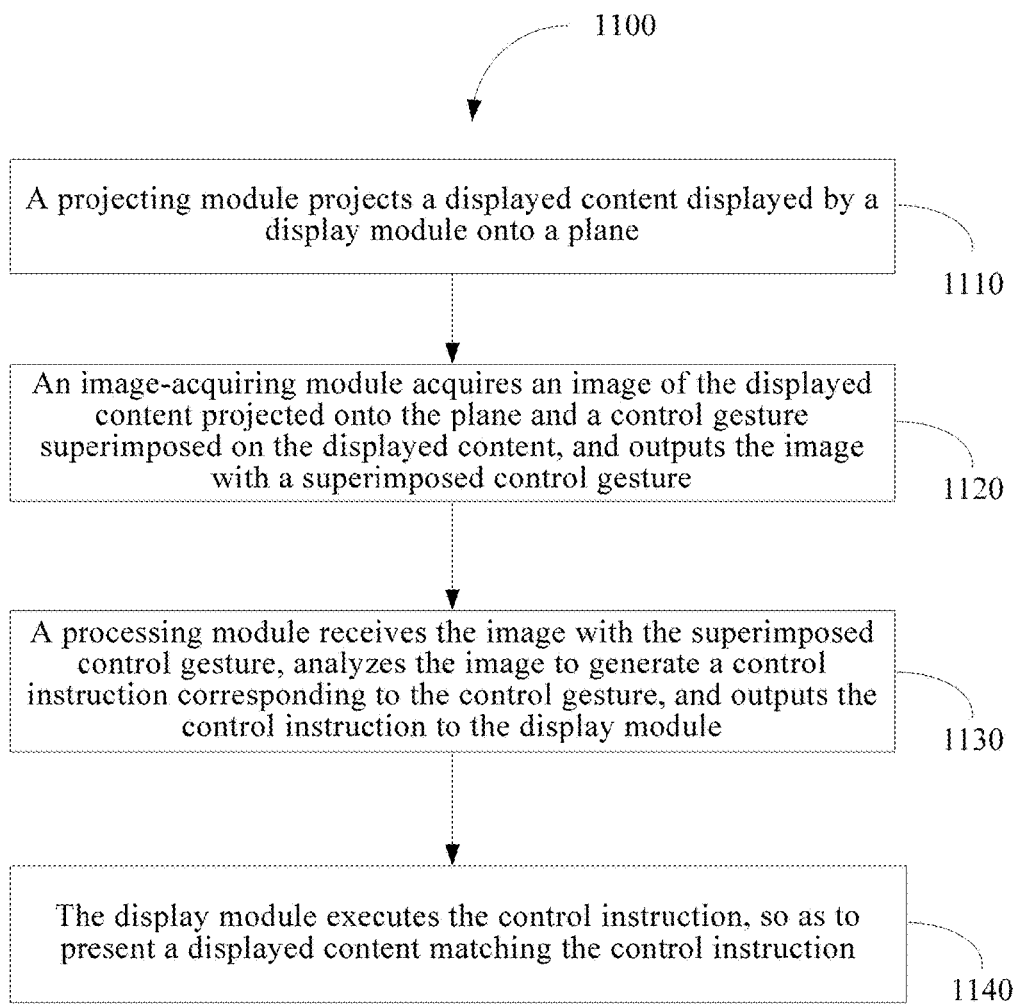
FIG. 11 is a flowchart of a glasses-type communication system controlling method by using a glasses-type information processing apparatus according to an embodiment of the present invention.

Referring to FIG. 11, in a method for controlling a glasses-type communications system according to another embodiment of the present invention, the glasses-type communications system includes a projecting module, a display module, an image-acquiring module, a processing module, and a camera module, where the control method includes:

1110. The projecting module projects a displayed content displayed by the display module onto a plane.

1120. The image-acquiring module acquires an image of the displayed content projected onto the plane and a control gesture superimposed on the displayed content, and outputs the image with a superimposed control gesture.

1130. The processing module receives the image with the superimposed control gesture, analyzes the image to generate a control instruction corresponding to the control gesture, and outputs the control instruction to the display module.

1140. The display module executes the control instruction, so as to present a displayed content matching the control instruction.

Figure 12:
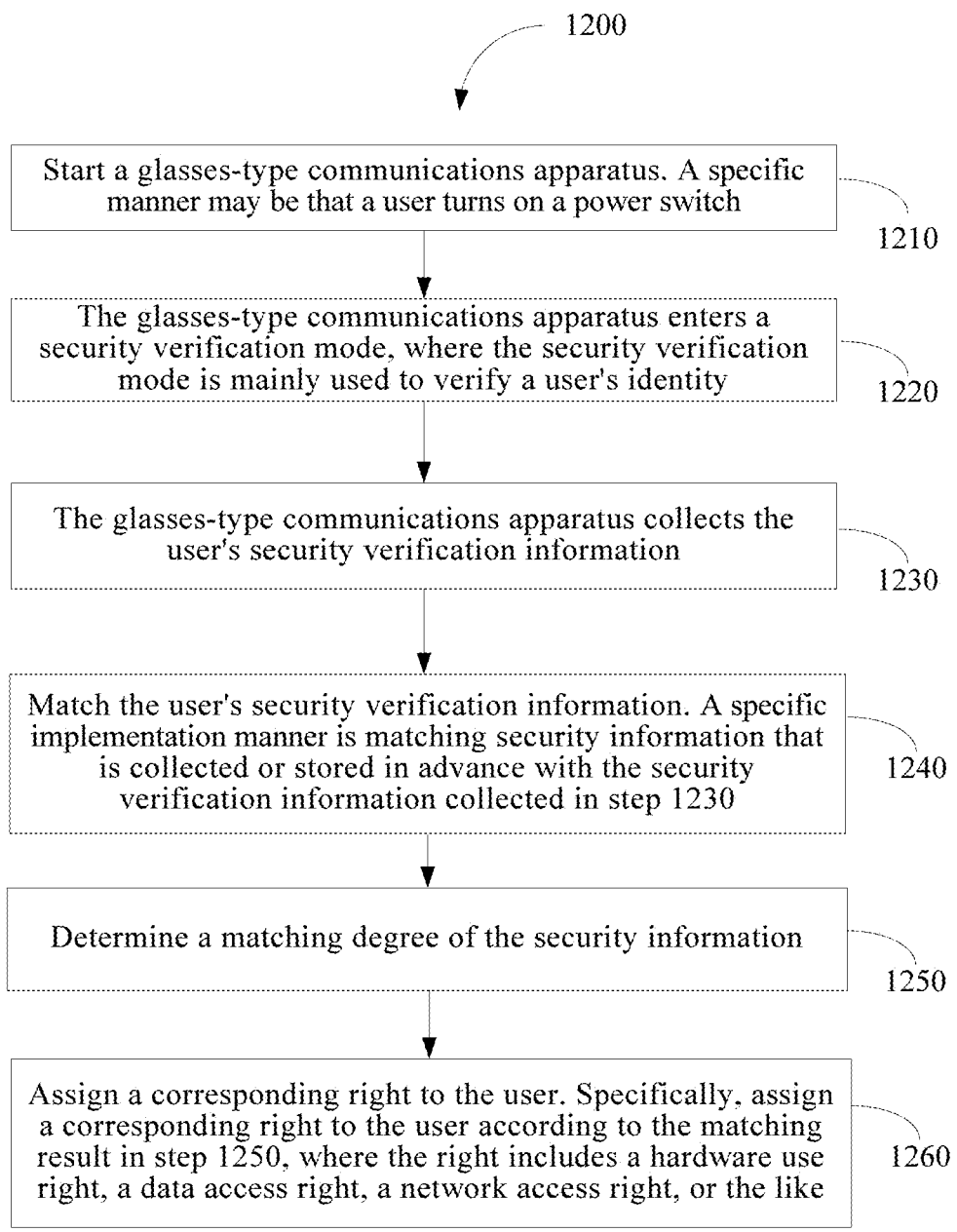
FIG. 12 is a flowchart of a security verification method of a glasses-type communications apparatus according to an embodiment of the present invention.

FIG. 12 is a flowchart of a security verification method 1200 of a glasses-type communications apparatus according to an embodiment of the present invention. As shown in the figure:

1210. Start the glasses-type communications apparatus. A specific manner may be that a user turns on a power switch.

1220. The glasses-type communications apparatus enters a security verification mode, where the security verification mode is mainly used to verify a user's identity.

1230. The glasses-type communications apparatus collects the user's security verification information.

The collecting manner may be: a first manner, where the communications apparatus collects the user's voice information as the security verification information by using a microphone module; a second manner, where the communications apparatus collects the user's iris information by using a camera module; a third manner, where the user enters a password; and a fourth manner, where the camera module is used to take an image of the user's face.

1240. Match the user's security verification information. A specific implementation manner is matching security information that is collected or stored in advance with the security verification information collected in step 1230.

1250. Determine a matching degree of the security information.

A specific implementation manner includes: manner 1: determine whether the entered password is identical to the predefined password; if they are identical, determine that the user passes the security verification; if the user fails to pass the security verification, the communications apparatus returns to step 1220; and manner 2: determine a similarity degree between the iris, human face, or voice obtained in step 1230 and the predefined iris, human face, or voice, where a threshold may be set (for example, the similarity degree is greater than 90% or another value), and when the similarity degree exceeds the threshold, determine that the user passes the security verification; if the user fails to pass the security verification, the communications apparatus returns to step 1220.

1260. Assign a corresponding right to the user. Specifically, assign a corresponding right to the user according to the matching result in step 1250, where the right includes a hardware use right, a data access right, a network access right, or the like.

Figure 13:
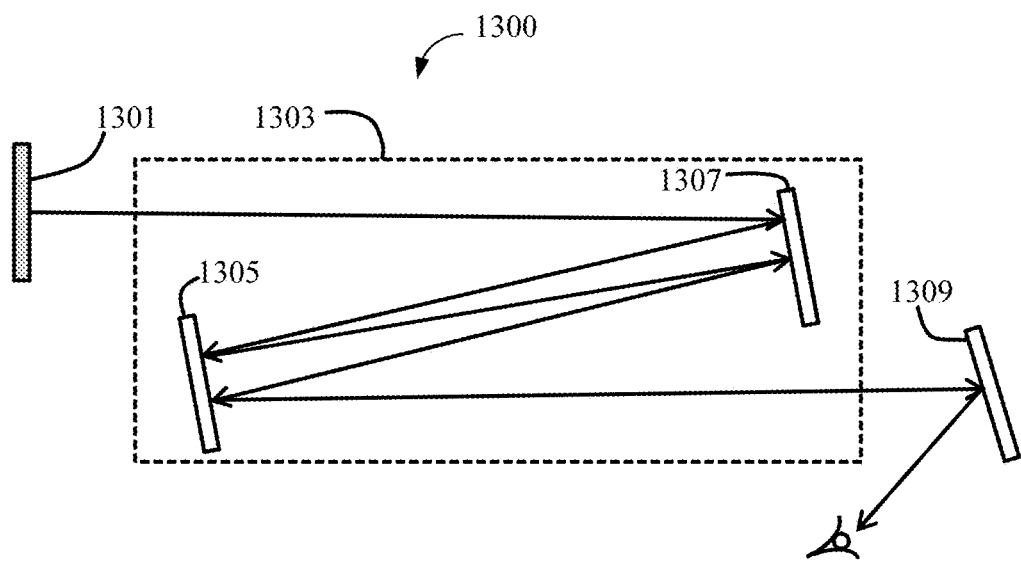
FIG. 13 illustrates a display system with a variable optical path length according to an embodiment of the present invention.

Referring to FIG. 13, FIG. 13 illustrates a display system with a variable optical path length according to another embodiment of the present invention. The display system 1300 with a variable optical path length includes an imaging unit 1301, an optical path length adjusting unit 1303, and a reflecting unit 1309. The optical path length adjusting unit 1303 is used to adjust an optical path length, and further includes a first optical path length increasing unit 1305 and a second optical path length increasing unit 1307. After image-displaying light emitted by the imaging unit goes through the optical path length adjusting unit 1303, an optical path length of the image-displaying light changes according to a setting of the optical path length adjusting unit. The reflecting unit 1309 is configured to reflect the image-displaying light going through the optical path length adjusting unit. The first optical path length increasing unit 1305 and the second optical path length increasing unit 1307 in the display system 1300 with a variable optical path length perform reflection for an even number of times: 2n. The imaging unit 1301 emits light in a direction different from an incident direction of a person's eyes.

The optical path length adjusting unit 1303 may include multiple optical path length increasing units 1305/1307, where the optical path length increasing units 1305/1307 specifically are reflectors. The image-displaying light is reflected for at least 2+1 times on at least two optical path length increasing units 1305/1307. Further, a reflection angle of the at least 2+1 times reflection is smaller than 5 degrees, where the reflection may be performed for more times within a range smaller than 2 degrees, so as to further increase the optical path length.

The optical path length adjusting unit 1303 increases the optical path length by reflecting the image-displaying light between the optical path length increasing units 1305/1307 for multiple times. Specifically, the optical path length adjusting unit 1303 may include three configurations of a short optical path length, a medium optical path length, and a long optical path length, which respectively correspond to a short-distance displayed image, a medium-distance displayed image, and a long-distance displayed image. Alternatively, the optical path length adjusting unit 1303 includes two sub-optical path length adjusting units, where the two sub-optical path length adjusting units are any two of a long optical path length adjusting unit, a medium optical path length adjusting unit, and a short optical path length adjusting unit, and FIG. 15 may be referenced to for specific implementation.

Figure 14:
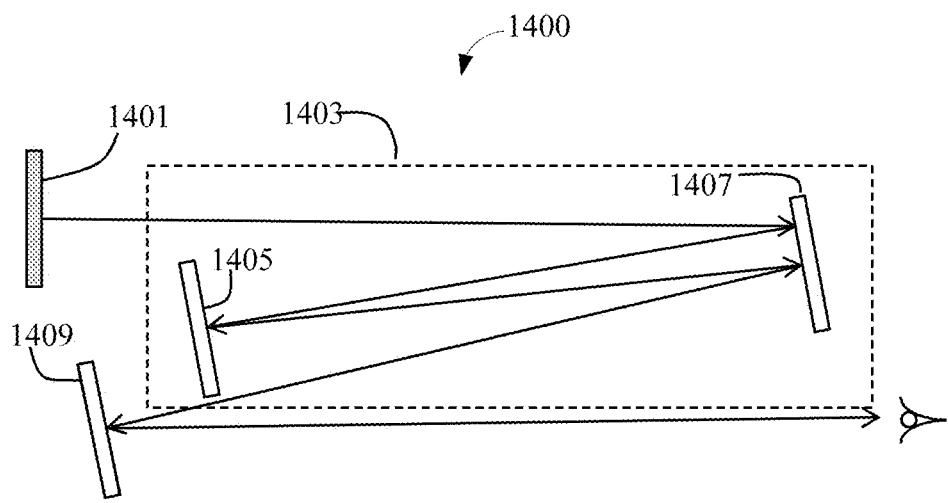
FIG. 14 illustrates another display system with a variable optical path length according to an embodiment of the present invention.

The following describes another display system with a variable optical path length as shown in FIG. 14. The display system 1400 with a variable optical path length includes an imaging unit 1401, an optical path length adjusting unit 1403, and a reflecting unit 1409. The optical path length adjusting unit 1403 is used to adjust an optical path length, and further includes a first optical path length increasing unit 1405 and a second optical path length increasing unit 1407. After image-displaying light emitted by the imaging unit goes through the optical path length adjusting unit 1403, an optical path length of the image-displaying light changes according to a setting of the optical path length adjusting unit. The reflecting unit 1409 is configured to reflect the image-displaying light going through the optical path length adjusting unit. The first optical path length increasing unit 1405 and the second optical path length increasing unit 1407 in the display system 1400 with a variable optical path length perform reflection for an odd number of times: 2n+1. The imaging unit 1401 and a person's eyes are located respectively on both sides of the optical path length adjusting unit 1403. The imaging unit 1401 emits light in a direction different from an incident direction of a person's eyes.

The optical path length adjusting unit 1403 increases the optical path length by reflecting the image-displaying light between the optical path length increasing units 1405/1407 for multiple times. Specifically, the optical path length adjusting unit 1403 may include three configurations of a short optical path length, a medium optical path length, and a long optical path length, which respectively correspond to a short-distance displayed image, a medium-distance displayed image, and a long-distance displayed image. Alternatively, the optical path length adjusting unit 1403 includes two sub-optical path length adjusting units, where the two optical path length adjusting units are any two of a long optical path length adjusting unit, a medium optical path length adjusting unit, and a short optical path length adjusting unit, and FIG. 15 may be referenced to for specific implementation.

Figure 15:
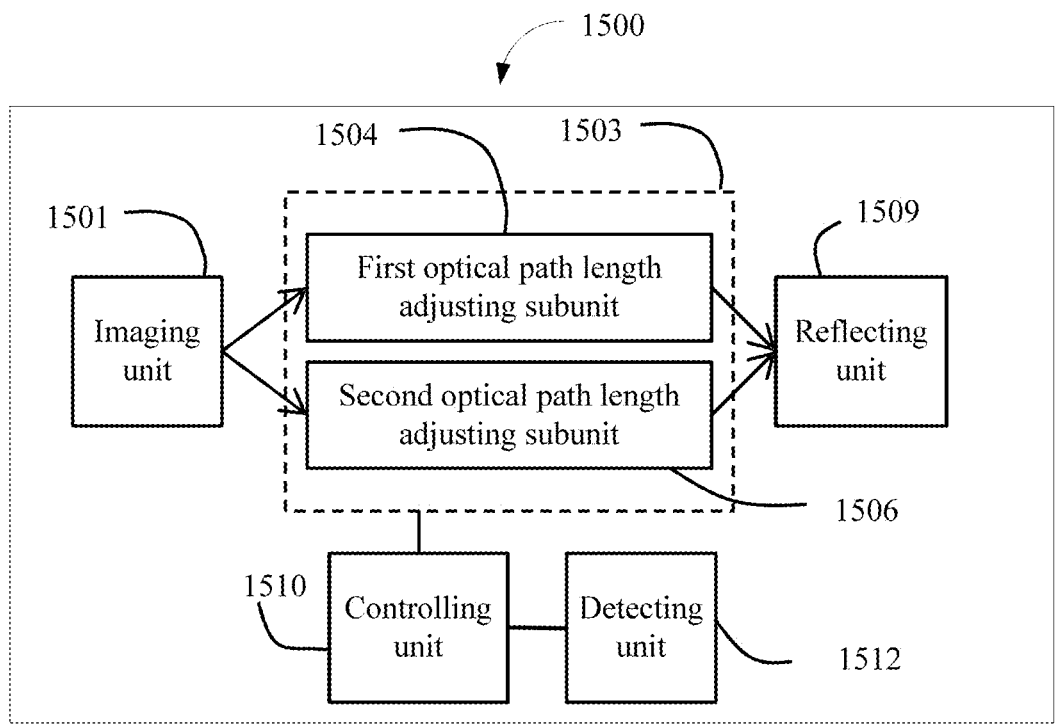
FIG. 15 illustrates still another display system with a variable optical path length according to an embodiment of the present invention.

The following provides another display system with a variable optical path length as shown in FIG. 15. The display system 1500 with a variable optical path length includes an imaging unit 1501, an optical path length adjusting unit 1503, a reflecting unit 1509, a controlling unit 1510, and a detecting unit 1512. The optical path length adjusting unit 1503 is configured to adjust an optical path length, and further includes a first optical path length adjusting subunit 1504 and a second optical path length adjusting subunit 1506. After image-displaying light emitted by the imaging unit 1501 goes through the optical path length adjusting unit 1503, an optical path length of the image-displaying light changes according to a setting of the optical path length adjusting unit. The reflecting unit 1509 is configured to reflect the image-displaying light going through the optical path length adjusting unit. The two optical path length adjusting subunits 1504 and 1506 are any two of a long optical path length adjusting unit, a medium optical path length adjusting unit, and a short optical path length adjusting unit. The optical path length adjusting unit 1503 may also include multiple optical path length adjusting subunits.

The detecting unit 1512 is configured to detect a size of a person's pupils, and calculate a vision distance of a current vision point of the person's eyes according to the size of the pupils.

The controlling unit 1510 is configured to adjust the optical path length of the optical path length adjusting unit 1503 according to the vision distance of the current vision point of the person's eyes, which specifically is selecting the first optical path length adjusting subunit 1504 or the second optical path length adjusting subunit 1506 to operate according to the vision distance of the current vision point of the person's eyes.

Figure 16:
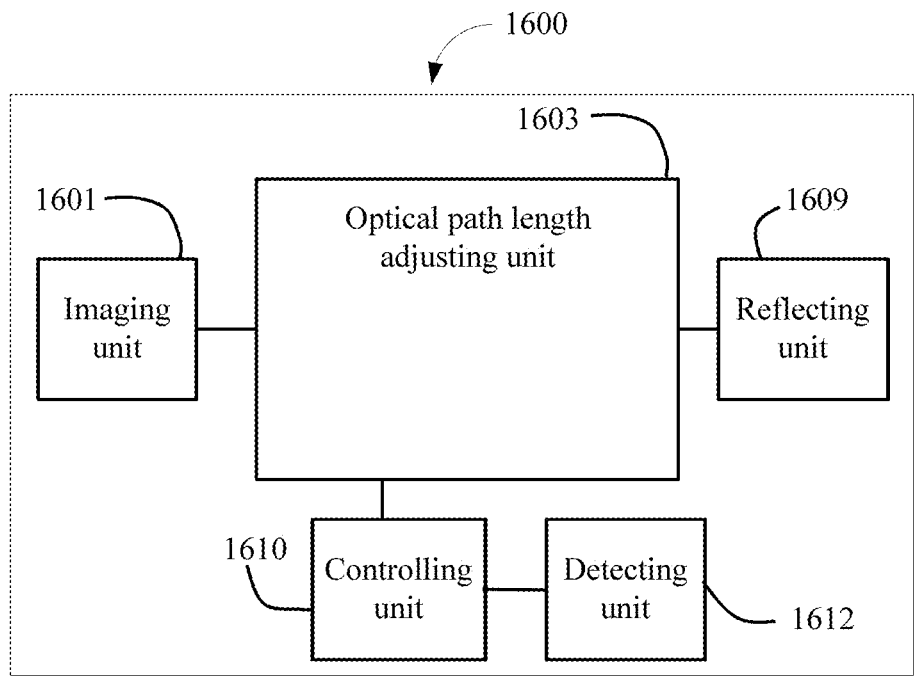
FIG. 16 illustrates a display system with a variable optical path length according to an embodiment of the present invention.

The following provides another display system with a variable optical path length as shown in FIG. 16. The display system 1600 with a variable optical path length includes an imaging unit 1601, an optical path length adjusting unit 1603, a reflecting unit 1609, a controlling unit 1610, and a detecting unit 1612. The optical path length adjusting unit 1603 is configured to adjust an optical path length, where FIG. 13 or FIG. 14 may be referenced to for specific implementation. After image-displaying light emitted by the imaging unit 1601 goes through the optical path length adjusting unit 1603, an optical path length of the image-displaying light changes according to a setting of the optical path length adjusting unit. The reflecting unit 1609 is configured to reflect the image-displaying light going through the optical path length adjusting unit. The optical path length adjusting unit 1603 includes any two of a long optical path length adjusting unit, a medium optical path length adjusting unit, and a short optical path length adjusting unit. The optical path length adjusting unit 1603 may also include multiple optical path length adjusting subunits.

The detecting unit 1612 is configured to detect a size of a person's pupils, and calculate a vision distance of a current vision point of the person's eyes according to the size of the pupils.

The controlling unit 1610 is configured to adjust the optical path length of the optical path length adjusting unit 1603 according to the vision distance of the current vision point of the person's eyes, which specifically is selecting the first optical path length adjusting subunit or the second optical path length adjusting subunit to operate according to the vision distance of the current vision point of the person's eyes.

Figure 17:
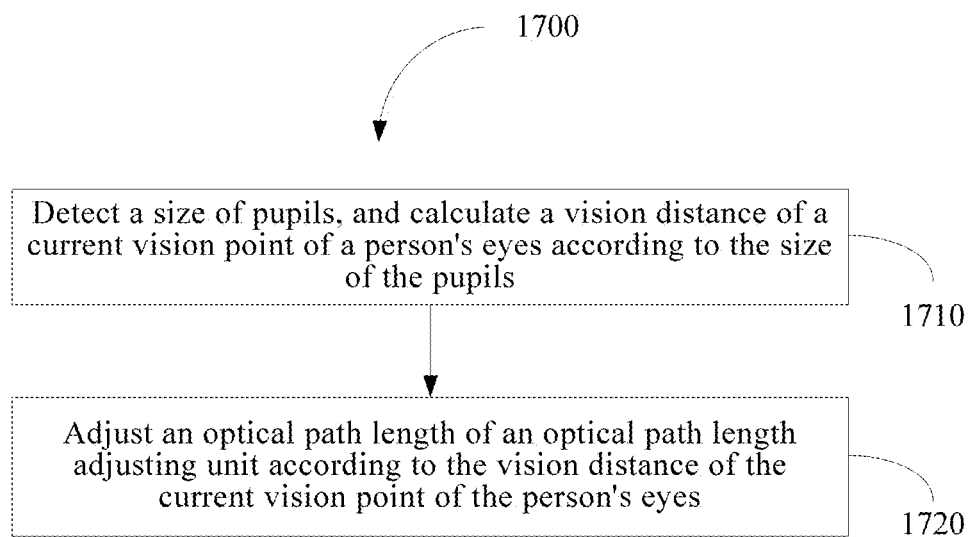
FIG. 17 is a flowchart of a method of operating a display system with a variable optical path length according to an embodiment of the present invention.

The following provides a flowchart of a method for the display systems with a variable optical path length illustrated in FIG. 15 and FIG. 16. As shown in FIG. 17, the method 1700 includes the following steps:

1710. Detect a size of pupils, and calculate a vision distance of a current vision point of a person's eyes according to the size of the pupils.

Specifically, an image-acquiring apparatus is used to obtain a pupil image. The size of the pupils is obtained according to the pupil image, and then the vision distance of the current vision point of the people's eyes is estimated according to the size of the pupils.

1720. Adjust an optical path length of the optical path length adjusting unit according to the vision distance of the current vision point of the person's eyes.

A specific manner of adjusting the optical path length of the optical path length adjusting unit includes selecting a first optical path length adjusting subunit or a second optical path length adjusting subunit in the optical path length adjusting unit to operate, or controlling image-displaying light to be reflected for more times in an optical path length increasing unit.

The optical path length adjusting unit according to the foregoing embodiment of the present invention may be located inside a leg of a pair of glasses, or be set on a side of the leg of the pair of glasses. The reflecting units 1309/1409/1509/1609 usually are fixed reflecting units, where a change or adjustment thereof usually does not cause a change in the optical path length. Preferentially, the reflecting units 1309/1409/1509/1609 are semi-reflecting units for transmitting real light and reflecting light emitted by the imaging unit. The reflecting units 1309/1409/1509/1609 may include multiple reflecting units for reflecting image-displaying light for multiple times to enter a person's eyes from the front, so that the person's eyes generate vision.

Figure 18:
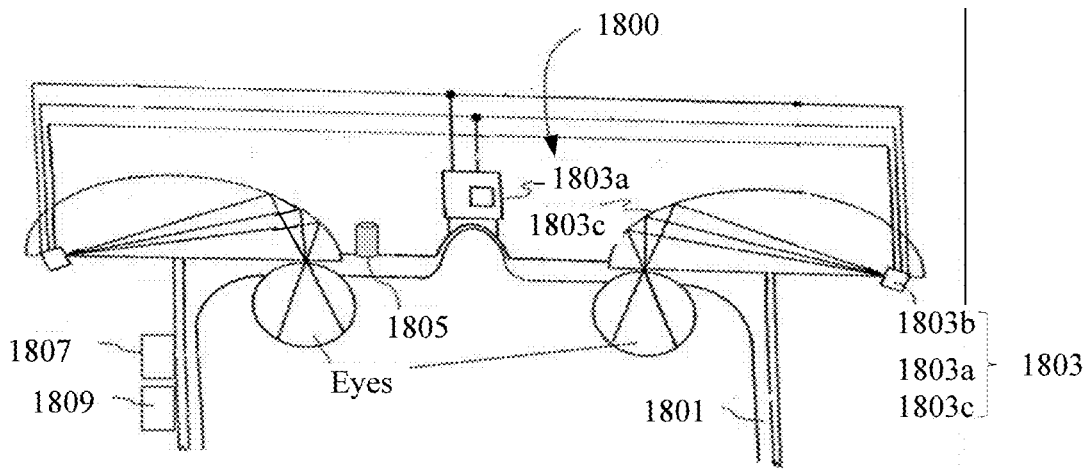
FIG. 18 is a schematic diagram of another glasses-type communications apparatus according to an embodiment of the present invention.

FIG. 18 is a schematic diagram of another glasses-type communications apparatus according to an embodiment of the present invention. An apparatus 1800 includes a frame 1801 configured to allow a user to wear the glasses-type communications apparatus on the head, and a display module 1803 set on the frame 1801 configured to display communication information, such as communication content in a form of a text, an image, or a video.

The display module 1803 includes a display controlling unit 1803a, a laser emitting unit 1803b, and a reflecting lens 1803c.

The display controlling unit 1083a receives a displayed content sent by a processing module 1809, and performs a processing operation to convert the displayed content into a control signal, so as to control the laser emitting unit 1803b to emit a display laser.

The laser emitting unit 1803b is configured to emit the display laser under the control of the control signal of the display controlling unit 1803a, where the display laser is emitted in a manner of recycle scanning and is projected to the reflecting lens 1803c.

The reflecting lens 1803c is configured to receive the scanning display laser emitted by the laser emitting unit 1803b, and project partial of the scanning display laser to a user's eyes in a manner of reflecting. The user's retina receives the display laser and senses the displayed content.

The camera module 1805 is set on the frame 1801 and configured to take a photo or video.

The communications module 1807 is set on the frame 1801, and is configured to provide communication between the apparatus and an external communications system. The module can provide communication with a wireless communications network or a wired communications network, so as to implement communication of content such as voice and data between the apparatus and the external communications network.

The processing module 1809 is set on the frame 1801, and is mainly configured to perform calculation and processing on various images and videos, for example, image, video, or audio encoding and decoding, and image rendering, which may further include other data technical processing, such as speech recognition, image recognition, and the like.

Figure 19:
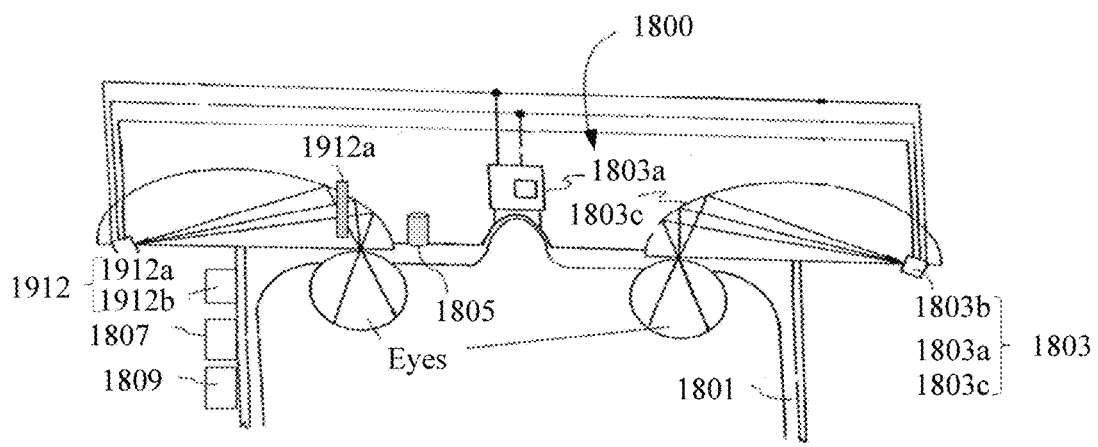
FIG. 19 is a schematic diagram of still another glasses-type communications apparatus according to an embodiment of the present invention.

Referring to FIG. 19, another glasses-type communications apparatus 1900 based on the glasses-type communications apparatus 1800 according to the embodiment of the present invention further includes a line-of-sight tracing unit 1912, where the line-of-sight tracing unit is configured to trace the user's line of sight and determine an object concerned by the user. The line-of-sight tracing unit 1912 includes a camera unit 1912a and a line-of-sight analyzing and processing unit 1912b. The camera unit 1912a takes a photo of a user's pupils. The line-of-sight analyzing and processing unit 1912b obtains the user's line of sight of concern by analyzing according to the user's pupil image taken by the camera unit 1912a, so as to determine a concerned object of a displayed content.

Figure 20:
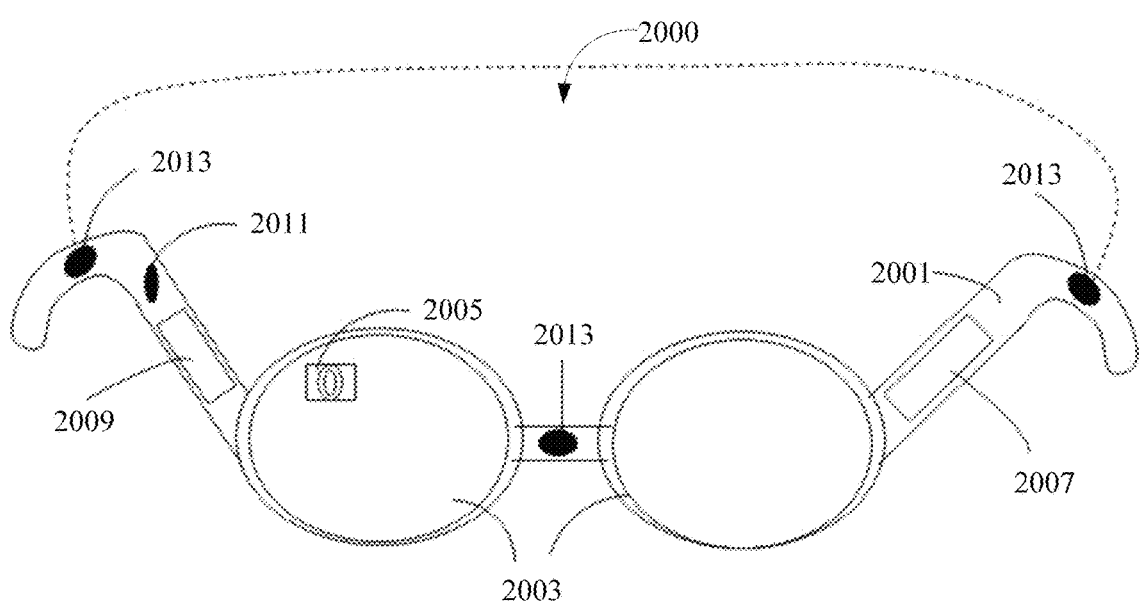
FIG. 20 illustrates a glasses-type apparatus for monitoring a user's health indicators and exercise state according to an embodiment of the present invention.

FIG. 20 is a schematic diagram of a glasses-type apparatus 2000 for monitoring a user's health indicators and exercise condition according to an embodiment of the present invention. As shown in the figure, an apparatus 2000 includes: a frame 2001 configured to allow a user to wear the glasses-type communications apparatus on the head; a display module 2003 set on the frame 2001 configured to display communication information, for example, communication content in a form of a text, an image, or a video; specifically, the apparatus may have one or two display modules; a camera module 2005 set on the frame 2001 configured to take a photo or video; specifically, there may be more than one camera module 2005, and the camera module may be set on the display module 2003; a communications module 2007 set on the frame 2001 configured to provide communication between the apparatus and an external communications system. The module can provide communication with a wireless communications network or a wired communications network, so as to implement communication of content such as voice and data between the apparatus and the external communications network; a processing module 2009 set on the frame 2001, mainly configured to perform calculation and processing on various images and videos, for example, image, video, or audio encoding and decoding, and image rendering, which may further include other data technical processing, such as speech recognition, image recognition, and the like; a microphone module 2011 set on the frame 2001 configured to obtain voice information and output the voice information; specifically, the microphone module 2011 is mainly configured to collect a user's voice information and instruction, or surrounding background sound; and a state sensor 2013, mainly configured to collect the user's health indicators and exercise state information, where there may be one or more state sensors; and the state sensor 2013 may be set on either end of the frame 2001 or between a group of two display modules group 2003.

Figure 21:
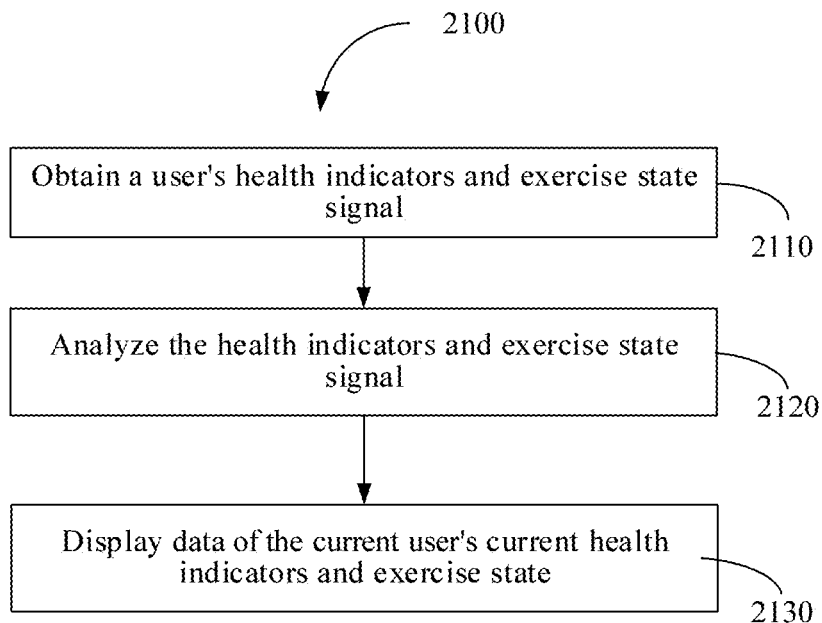
FIG. 21 illustrates a method according to an embodiment of the present invention for displaying a user's health information by using the glasses-type communications apparatus illustrated in FIG. 20.

Referring to FIG. 21, a method 2100 for displaying a user's health information by using a glasses-type communications apparatus 2000 according to an embodiment of the present invention includes:

2110. Obtain a user's health indicators and exercise state signal.

Specifically, the state sensor 2013 may be used to obtain health indicators by measuring a contact resistance with a person's head skin or by capturing a biological microelectrical signal, or the exercise state signal may be obtained by sensing a change in a person's location, exercise speed, and exercise angle.

2120. Analyze the health indicators and exercise state signal.

Specifically, the health indicators and the person's exercise state signal are obtained by using the state sensor 2013, and are transferred to the processor module 2009 for analyzing data, which may be compared with basic historical statistics data to calculate data of a change in the user's current health indicators and exercise state.

2130. Display the data of the current user's health indicators and exercise state.

Specifically, the processor module 2009, after completing analysis of the data, sends the data to the display module 2003 to display the data of a change in the user's current health indicators and exercise state.

Figure 22:
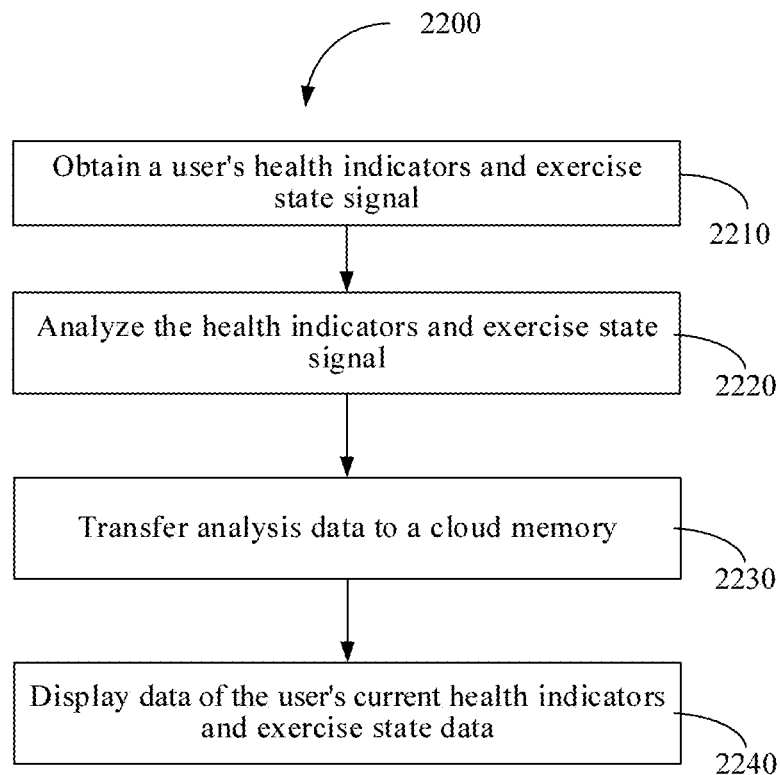
FIG. 22 is a block diagram of a flowchart of a method for displaying a user's health information by using a glasses-type communications apparatus according to the present invention.

A flowchart for monitoring of a user's health indicators and exercise state by using a glasses-type according to an embodiment of the present invention;

Referring to FIG. 22, a method 2200 for displaying a user's health information by using a glasses-type communications apparatus 2000 according to an embodiment of the present invention includes:

2210. Obtain a user's health indicators and exercise state signal.

Specifically, the state sensor 2013 may be used to obtain health indicators by measuring a contact resistance with a person's head skin or by capturing a biological micro-electrical signal, or the exercise state signal may be obtained by sensing a change in a person's location, exercise speed, and exercise angle.

2220. Analyze the health indicators and exercise state signal.

Specifically, the health indicators and the person's exercise state signal are obtained by using the state sensor 2013, and are transferred to the processor module 2009 for analyzing data, which may be compared with basic historical statistics data to calculate data of a change in the user's current health indicators and exercise state.

2230. Transfer the analysis data to a cloud memory.

Specifically, the data of the user's current health indicators and exercise state that is calculated by the processor module 2009 is transmitted to the cloud memory by using the communications module 2007.

2240. Display the data of the user's current health indicators and exercise state.

According to a setting, the data of a change in the user's health indicators and exercise state is obtained by the communications module 2007 from the cloud memory, and sent to the display module 2003 to display the data of a change in the user's current health indicators and exercise state. Specifically, FIG. 23 shows a specific display picture for displaying a health index and exercise state after the foregoing method is implemented.

Figure 24:
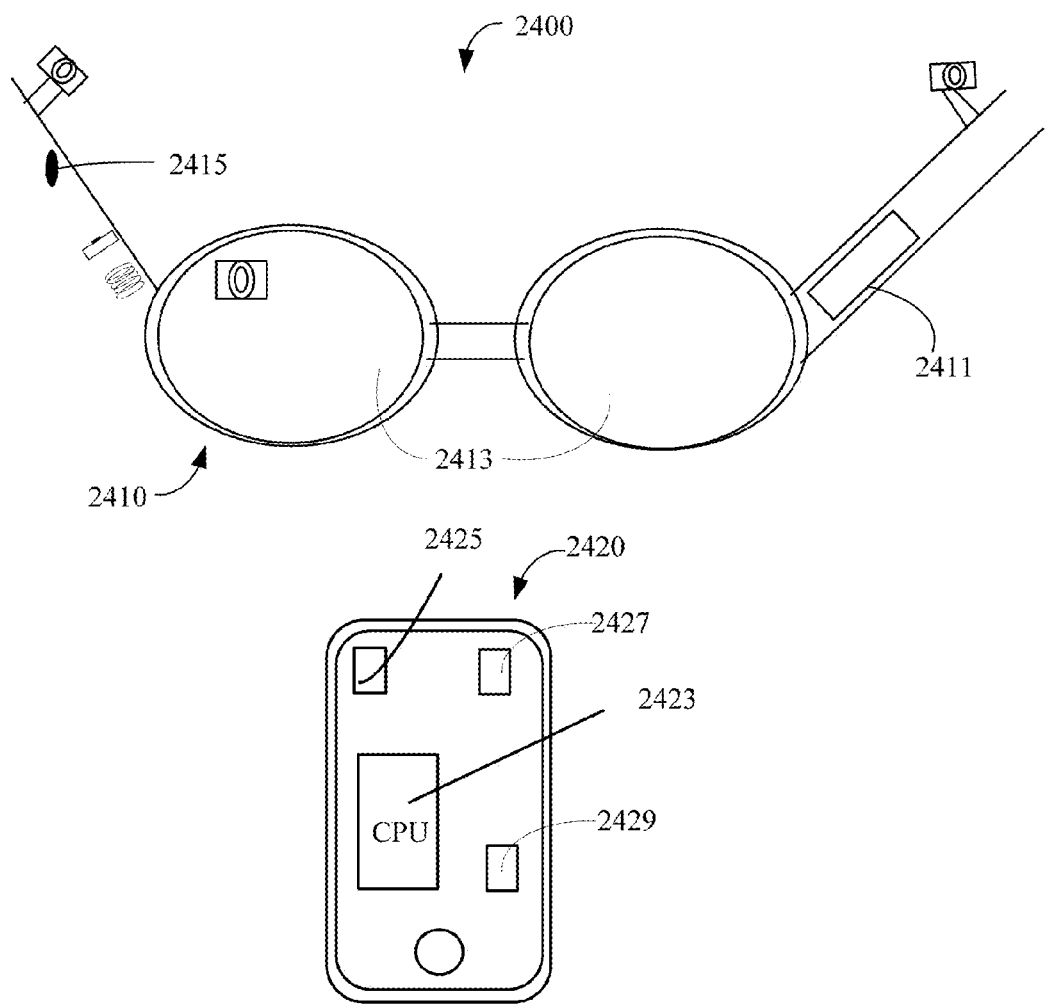
FIG. 24 is a glasses-type communications system according to an embodiment of the present invention.

Referring to FIG. 24, FIG. 24 illustrates a glasses-type communications system 2400 according to an embodiment of the present invention. The system 2400 includes a glasses-type communications apparatus 2410 and an external apparatus 2420. The communications apparatus 2410 has at least one communications module 2411 and at least one display apparatus module 2413 for communicating with the external apparatus 2420. The communication manner may be a wireless or wired manner. The wireless manner may be a manner such as Wi-Fi, Zigbee®, Bluetooth®, or Wireless HDMI. The display apparatus module 2413 may be used to synchronously display a picture of the external apparatus 2420. The external apparatus 2420 may be a mobile communications device such as a mobile phone or a Pad. A user may adjust the external apparatus 2420 to obtain a desired interface in advance as required, and then synchronize the picture to the communications apparatus 2410 for displaying by using the display module 2413, so as to release the hands.

The glasses-type communications apparatus 2410 further includes a microphone module 2415 configured to receive the user's speech instruction, and transfer voice information to the external apparatus 2420 by using the communications module 2411. The external apparatus 2420 includes a speech recognition module 2421, where the speech recognition module 2421 is configured to perform speech recognition and analysis on the voice information received by the external apparatus 2420. The external apparatus 2420 makes a corresponding response according to the speech recognition and analysis result.

The external apparatus 2420 includes: a processor module 2423 configured to process data information related to the glasses-type communications apparatus 2410, where the processor module 2423 may be used to perform operations, such as video compression and decompression, voice encoding and decoding, and image rendering and enhancement, on the data information related to the glasses-type communications apparatus 2410; and a network connection module 2425 configured to communicate with the Internet or a radio communications system to provide network access for a user; a communications module 2427 for the external apparatus 2420 to communicate with the glasses-type communications apparatus 2410; and a picture controlling module 2429 configured to control to switch/synchronize a picture to the glasses-type communications apparatus 2410 and display the picture on the display apparatus module 2413.

Figure 25:
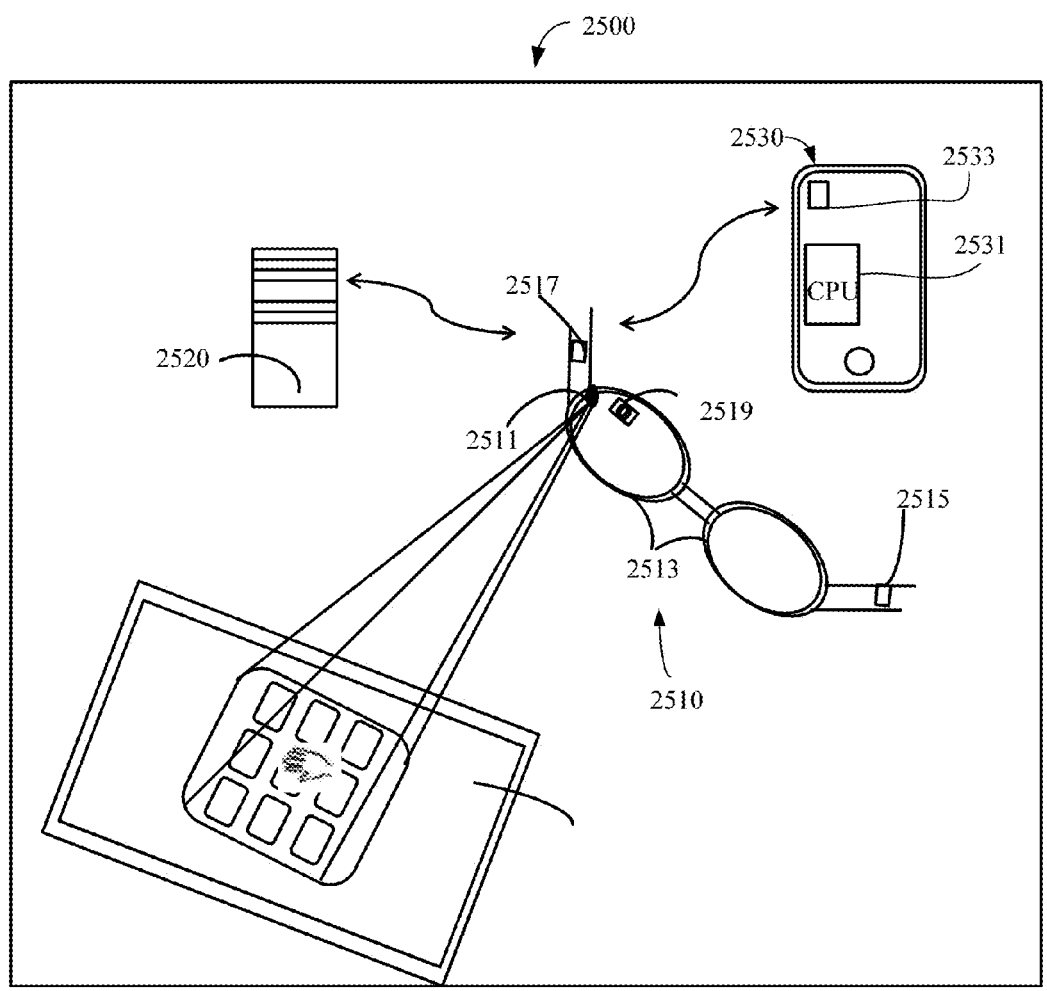
FIG. 25 is another glasses-type communications system according to an embodiment of the present invention.

Referring to FIG. 25, another glasses-type communications system 2500 according to an embodiment of the present invention includes: a glasses-type communications apparatus 2510, where the glasses-type communications apparatus 2510 includes at least one projecting module 2511, a display module 2513, a communications module 2515, and a processing module 2517. The projecting module 2511 projects content displayed in the display module 2513 onto a plane a. The glasses-type communications apparatus 2510 further includes a camera module 2519 configured to take a new image after an operation is performed on a projected image, and send the new image to a background or a cloud apparatus 2520. The cloud or background performs image processing, calculates an operation instruction, and makes a response. Further, the processing on the image taken by the camera module 2519 may be performed locally on the glasses-type communications apparatus 2510, where the processing module 2517 on the communications apparatus 2510 is used to perform corresponding processing and make a response; alternatively and simply, the communications module 2515 may be used to transfer the image to the external apparatus 2530, where the processing module 2531 in the external apparatus 2530 performs processing and makes a response, where information about the response may be transferred to the glasses-type communications apparatus by using the communications module 2533 of the external apparatus 2530.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A glasses-type information processing apparatus, comprising:
 a frame configured to allow a user to wear the glasses-type information processing apparatus on the user's head;
 at least one display, wherein the at least one display is set on the frame, and is configured to receive data information and generate a corresponding visual picture according to the received data information for the user to watch;

at least one camera set on the frame and configured to obtain image information and output the image information; and a computer processor set on the frame and connected to the at least one display and the at least one camera to transfer the data information to the at least one display and receive the image information output by the camera, wherein the at least one camera is configured to obtain information about at least two groups of images within at least two shooting ranges that are continuous in space, wherein the computer processor is configured to receive the information about the at least two groups of images and merge the information about the two pieces of images, wherein a merging manner comprises selecting a portion from information about each group of images to make a combination image, wherein the images are shot at various angles using rotatable cameras, wherein the combination image provides an all-around image showing the various angles, and wherein the computer processor is further configured to:
obtain a pupil image;
detect a size of a pupil according to the pupil image;
estimate a vision distance of a current vision point of the pupil according to the size of the pupil; and
adjust an optical path length of the glasses-type information processing apparatus using at least two reflectors according to the vision distance of the current vision point of the pupil.

2. The apparatus according to claim 1, wherein the at least one camera comprises at least one light-field camera apparatus.

3. The apparatus according to claim 1, wherein the at least one camera is rotatable for adjusting a shooting range of the camera.

4. The apparatus according to claim 1, wherein the at least one camera is configured to obtain information about an image behind the user.

5. The apparatus according to claim 1, wherein the at least one camera is configured to obtain information about an image above the user.

6. The apparatus according to claim 1, wherein the at least one camera is configured to obtain information about an image to the left of the user.

7. The apparatus according to claim 1, Wherein the at least one camera is configured to obtain information about an image to the right of the user.

8. The apparatus according to claim 1, wherein the at least one camera comprises a first camera and a second camera, wherein the first camera is set on a first side of the frame, and wherein the second camera is set on a second side of the frame.

9. The apparatus according to claim 8, wherein both the first camera and the second camera are configured to rotate 360 degrees.

10. The apparatus according to claim 9, wherein both the first camera and the second camera are set on rotatable bases that are fixed to the frame, and wherein the rotatable bases are controlled by micro motors.

11. A glasses-type information processing apparatus, comprising:
a frame configured to allow a user to wear the glasses-type information processing apparatus on the user's head;

at least one display, wherein the at least one display is set on the frame, and is configured to receive data information and generate a corresponding visual picture according to the received data information for the user to watch;

at least one camera set on the frame and configured to obtain image information and output the image information; and a computer processor set on the frame and connected to the at least one display and the at least one camera to transfer the data information to the at least one display and receive the image information output by the camera, wherein the at least one camera is configured to obtain information about at least two groups of images within at least two shooting ranges that are continuous in space, wherein the computer processor is configured to receive the information about the at least two groups of images and merge the information about the two pieces of images, wherein a merging manner comprises merging the information about the at least two groups of images along edges in sequence, wherein the images are shot at various angles using rotatable cameras, wherein the combination image provides an all-around image showing the various angles, and wherein the computer processor is further configured to:
obtain a pupil image;
detect a size of a pupil according to the pupil image;
estimate a vision distance of a current vision point of the pupil according to the size of the pupil; and
adjust an optical path length of the glasses-type information processing apparatus using at least two reflectors according to the vision distance of the current vision point of the pupil.

12. The apparatus according to claim 1, wherein the images are shot at various angles using rotatable cameras comprises the rotatable cameras rotating 360 degrees, and wherein the combination image provides an all-around image showing the various angles comprises the all-around image showing a 360 degree view.

13. The apparatus according to claim 11, wherein the images are shot at various angles using rotatable cameras comprises the rotatable cameras rotating 360 degrees, and wherein the combination image provides an all-around image showing the various angles comprises the all-around image showing a 360 degree view.

14. The apparatus according to claim 1, wherein the computer processor is further configured to trace a user's line of sight using pupil images and determine an object of concern to the user.

15. The apparatus according to claim 1, wherein the computer processor is further configured to display a control gesture superimposed on displayed content.

16. The apparatus according to claim 1, further comprising:
a rechargeable battery that provides electrical energy to the apparatus; and
an electromagnetic induction coil that generates the electrical energy according to electromagnetic induction and stores the electrical energy to the rechargeable battery.

17. The apparatus according to claim 1, further comprising:

a rechargeable battery that provides electrical energy to the apparatus; and a solar panel that generates the electrical energy using solar energy and stores the electrical energy to the rechargeable battery.

18. The apparatus according to claim 11, wherein the computer processor is further configured to trace a user's line of sight using pupil images and determine an object of concern to the user.

19. The apparatus according to claim 11, wherein the computer processor is further configured to display a control gesture superimposed on displayed content.

20. The apparatus according to claim 11, further comprising:

a rechargeable battery that provides electrical energy to the apparatus; and an electromagnetic induction coil that generates the electrical energy according to electromagnetic induction and stores the electrical energy to the rechargeable battery.

* * * * *